United States Patent
Eki et al.

[19]

[11] Patent Number: 5,843,291
[45] Date of Patent: Dec. 1, 1998

[54] WATER ELECTROLYZER

[75] Inventors: Toshio Eki; Toshiharu Otsuka; Kazuyuki Enomoto; Tomohiro Nishi, all of Kita-kyushu, Japan

[73] Assignee: Toto Ltd., Fukuoka, Japan

[21] Appl. No.: 793,262

[22] PCT Filed: Aug. 22, 1995

[86] PCT No.: PCT/JP95/01655

§ 371 Date: Feb. 21, 1997

§ 102(e) Date: Feb. 21, 1997

[87] PCT Pub. No.: WO96/06049

PCT Pub. Date: Feb. 29, 1996

[30] Foreign Application Priority Data

Aug. 23, 1994 [JP] Japan ................................. 6-222577

[51] Int. Cl.$^6$ ............................. C25B 9/00; C25B 15/00
[52] U.S. Cl. ...................... 204/228; 204/275; 204/263
[58] Field of Search .................... 204/228, 275, 204/263

[56] References Cited

U.S. PATENT DOCUMENTS 4,810,344   3/1989   Okazaki ................................. 204/228
4,867,856   9/1989   Okazaki .............................. 204/260 X

FOREIGN PATENT DOCUMENTS 51-77584    7/1976    Japan .
55-91996    6/1980    Japan .
59-189871  12/1984    Japan .
1-203097    8/1989    Japan .
4-40795     9/1992    Japan .
4-284889   10/1992    Japan .
5-245474    9/1993    Japan .
6-312182   11/1994    Japan .
7-108272    4/1995    Japan .
7-185547    7/1995    Japan .

*Primary Examiner*—Donald R. Valentine
*Attorney, Agent, or Firm*—Finnegan, Henderson, Farabow, Garrett & Dunner, L.L.P.

[57] ABSTRACT

An electrolyzer for producing alkaline and/or acidic water by way of electrolysis of water. In order to remove scale such as calcium carbonate deposited on the electrodes of the electrolytic cell (36) during electrolysis, the control unit (166) operates a polarity reversal switch (186) at a predetermined timing to reverse the electric potential applied to the electrodes of the electrolytic cell (36). The control unit (166) includes means (190/192) for detecting the hardness of water and varies the duration of application of DC voltage of opposite polarity in accordance with the hardness of water. Hardness of water is preferably determined by detecting the electric conductivity of water. Time required for removal of scale is shortened.

8 Claims, 22 Drawing Sheets

WATER ELECTROLYZER

TECHNICAL FIELD

The present invention relates to a water electrolyzer for electrochemically producing alkaline and/or acidic water. More particularly, the present invention is concerned with a water electrolyzer wherein scales, such as calcium carbonate, deposited on electrodes during electrolysis are effectively removed.

BACKGROUND ART

It is believed that hydroxyl ion (OH⁻) enriched alkaline water, which is often incorrectly referred-to as "alkaline ion water", is useful in health maintenance when served as potable water as well as in accentuating taste when used in cooking or for the preparation of beverages such as tea and coffee. Similarly, hydrogen ion ($H^+$) enriched acidic water is known as being suitable for boiling noodles and washing faces. More importantly, highly acidic water which is obtained by electrolysis of an aqueous solution of sodium chloride and which therefore contains effective chlorine (hypochlorous acid or chlorine gas) has been noted as having a strong germicidal effect.

To produce alkaline and/or acidic water, an apparatus for electrolyzing water has been used hitherto which is often incorrectly referred-to in the art as "ion water generator". This apparatus, designed to subject water to electrolysis, includes an electrolytic cell having an anode and a cathode. As a direct electric potential is applied between the electrodes, the hydroxyl ions OH⁻ being present in water due to electrolytic dissociation of water molecules will donate electrons to the anode at the anode-water interface and are thereby oxidized to form oxygen gas which is then removed away from the system. As a result, the $H^+$ concentration is enhanced at the anode-water interface so that $H^+$ enriched acidic water is resulted at the anode-water interface. At the cathode-water interface, on the other hand, $H^+$ accepts electron from the cathode and is reduced to hydrogen to form hydrogen gas which is similarly eliminated from the system. As a result, the OH⁻ concentration is increased whereby OH⁻ enriched alkaline water is generated at the cathode side. When an aqueous solution of sodium chloride is subjected to electrolysis, chlorine gas is generated at the anode and is dissolved into water to form hypochlorous acid.

To preclude alkaline water and acidic water once generated by electrolysis from being mixed with each other and to take them out separately, the conventional electrolytic cells are typically provided with a water-impermeable but ion-permeable membrane 3 arranged between an anode plate 1 and a cathode plate 2 as schematically shown in FIG. 1, the electrolytic chamber being divided by the membrane into a flowpath 4 for alkaline water and a flowpath 5 for acidic water. The electrolytic cell of this type will be referred-to hereinafter as the "membrane-type" electrolytic cell.

As the electrolytic cell is operated, precipitation of scale 6 comprised of calcium carbonate, calcium hydroxide, magnesium hydroxide and the like takes place in the flowpath for alkaline water. Referring to FIG. 2 wherein the apparent solubility of calcium carbonate versus pH is shown, the mechanism of scale precipitation will be described with reference to calcium hydroxide by way of an example. It will be noted from the graph that under acid conditions, calcium carbonate is dissolved into water in the form of calcium ions. However, as the pH exceeds 8, the solubility is rapidly drops thereby giving rise to precipitation of calcium carbonate. In the electrolytic cell of the membrane type, the scale tends to precipitate predominantly on the membrane 3 rather than on the cathode 2, as shown in FIG. 1. Probably, this is because the porous nature of the membrane promotes precipitation of scale, in contrast to the cathode generally having a polished specular surface. Since the precipitates such as calcium carbonate are electrically insulating, the electrical resistance across the cell is increased thereby lowering the efficiency of electrolysis of the cell. In addition, formation of scale increases the flow resistance across the electrolytic cell. Therefore, unless the scale is removed, the electrolytic cell would become inoperative soon after a short period of use.

Accordingly, there has been proposed in the prior art to remove the precipitates by dissolving them into water as disclosed, for example, in Japanese Patent Kokai Publication 51-77584, Japanese Utility Model Kokai Publication 55-91996, Japanese Utility Model Kokai Publication 59-189871, and Japanese Patent Kokai Publication 1-203097. According to this method, a polarity reversal switch 7 is turned over in such a manner that an electric potential of an polarity opposite to the normal operating polarity is applied between the electrodes to thereby cause the precipitates to dissolve. This method of descaling by application of the reverse polarity potential is known in the art as "reverse potential descaling" or "reverse electrolysis descaling" process. The principle of reverse electrolysis descaling is that, upon application of electric potential of the opposite polarity, the flowpath for the alkaline water is changed into acidic conditions whereby the scale such as calcium carbonate is disintegrated into ions to again dissolve into water as will be understood from FIG. 2.

However, since the membrane 3 is more or less spaced from the electrodes as will be understood from FIG. 1, the stream of strongly acidic water which has been generated along the surface of the electrode 2 (originally acting as the cathode, but now acting as the anode to produce acidic water because the polarity of potential is reversed) will be carried away by the flow of water flowing through the flowpath or will be diluted by diffusion. Therefore, the membrane which is remote from the electrodes cannot be rendered acidic to a degree strong enough to quickly dissolve the scales deposited on the membrane.

For this reasons, in the "membrane-type" electrolytic cell, it has been difficult to electrochemically remove the scale even though the so-called reverse electrolysis descaling is carried out. Accordingly, it has been usual that the life of the electrolytic cells is only from a half to one year unless the cells are periodically disassembled and are subjected to manual mechanical descaling operations. Furthermore, the membrane is unhygienic since it serves as breeding bed for bacteria.

In order to overcome the foregoing disadvantages of the membrane-type electrolytic cell, proposed in Japanese Patent Kokai Publication 4-284889 is an electrolytic cell which is free from a membrane. The electrolytic cell of this type will be referred-to hereinafter as the "non-membrane" type electrolytic cell. In the non-membrane type cell, the electrode plates are spaced from one another with a small gap in such a manner that a laminar flow is established as water flows between the electrodes. Therefore, alkaline water and acidic water as generated can be separated from each other without recourse to a membrane.

As the non-membrane type electrolytic cell is not provided with a membrane which is susceptible to deposition of scale, there is an advantage that less scale is deposited. The formation of scale takes place primarily on the electrode plate which acts as the cathode for producing alkaline water.

Moreover, the cell is hygienic because of the absence of a membrane which would otherwise breed bacteria.

The "non-membrane" electrolytic cell of JP 4-284889 is also designed such that the reverse polarity potential is applied to carry out the so-called reverse electrolysis descaling in a manner similar to the conventional membrane-type electrolytic cells.

Regardless of whether the electrolytic cell is of the membrane type or the non-membrane type, the conventional water electrolyzers are designed such that the reverse potential descaling of the electrodes is carried out at the outset of the period during which water is fed to the cell. In addition, it has been customary to set the duration of the reverse potential descaling constant.

In this regard, the likelihood or tendency of precipitation of the scales such as calcium carbonate varies depending on the quality of water which, in turn, significantly differs geographically from region to region. In a region where the quality of water is such that a large amount of calcium ions and magnesium ions are contained and, hence, the scales tend to precipitate on the electrodes, it is desirable that the duration of the reverse potential descaling be set for as long period as possible to ensure that descaling is performed completely. Accordingly, in the prior art, it has been the general practice to set the duration of the reverse potential descaling long enough so as to meet with and cover a region of such an extreme water quality that contains a large amount of calcium ions and magnesium ions.

However, water that flows out of the electrolyzer during the reverse potential descaling may contain the scales as released from the electrodes upon application of the reverse potential and, hence, is not suitable to drink. Therefore, the user who has commenced feed of water to the electrolytic cell must await and stand by without recovering the electrolyzed water until the reverse potential descaling is completed. This means that the time interval from the commencement of water feed to the termination of the reverse potential descaling will amount to the so-called dead time. This brings about the inconvenience that, in a region where the amount of calcium and magnesium ions is smaller, the stand-by time or wait time would be longer than is necessary so that the electrolyzer would be difficult to use, if the duration of the reverse potential descaling has been set too long.

The object of the invention is to provide a water electrolyzer wherein the removal of the scales is effectively carried out so as to extend the service life of the electrolytic cell and which is yet easy to use in the sense that the stand-by time required to achieve the reverse potential descaling is minimized.

DISCLOSURE OF THE INVENTION

According to the invention, the water electrolyzer includes an electrolytic cell provided with a pair of electrodes forming an electrolytic flowpath therebetween, means for applying between said electrodes a DC potential of a predetermined polarity so as to electrolyze water flowing through said flowpath to thereby produce alkaline and acidic water, switching means for reversing the polarity of the DC potential applied between said electrodes, and control means for controlling said switching means in such a manner that a DC potential of a polarity opposite to said predetermined polarity is applied between the electrodes at a predetermined timing to remove scale precipitated on the electrodes during electrolysis of water. The feature of the invention is that the control means comprises means for detecting the hardness of water to be electrolyzed and is operable to control the duration of application of DC potential of the opposite polarity in accordance with the hardness of water as detected. The duration of reverse potential descaling is determined to be longer for hard water but shorter for soft water. As in this manner the duration of the reverse potential descaling is varied in accordance with the hardness of water, the descaling is carried out only for a requisite minimum time period so that the stand-by time or wait time is shortened.

The hardness of water is proportional to the electric conductivity of water. Accordingly, in a preferred embodiment of the invention, the electric conductivity of water is detected and the hardness of water is derived by presumption from the electric conductivity. Preferably, in order to detect the electric conductivity of water, the voltage and current of electrolysis applied to the electrolytic cell are detected and the electric conductivity of water is computed in accordance with the detected voltage and current of electrolysis. With this arrangement, the hardness of water can be detected in a simple manner whereby the costs of the apparatus are reduced.

In situations wherein the electrolytic cell is operated alternately in the alkaline water supply mode and the acidic water supply mode, it would be ideal to cumulate in a countervailing manner the duration of electrolysis in the alkaline water supply mode and the duration of electrolysis in the acidic water supply mode so as to detect the mode which has been used for a longer period of time and to then perform the reverse potential descaling by applying between the electrodes a DC potential of a polarity opposite to the polarity of the longer-used mode.

However, in the case where the electrolytic cell is operated firstly in one mode (e.g., the alkaline water supply mode) and then in the other mode (e.g., the acidic water supply mode), the electrodes of the cell will be subjected to the reverse potential descaling automatically or intrinsically so as to undergo "self-cleaning" because the polarity of the potential applied between the electrodes is reversed. It is therefore desirable that the duration of electrolysis in the alkaline water supply mode and the duration in the acidic water supply mode are cumulated by taking the duration of self-cleaning into account. In this regard, the time period required for self-cleaning is definite for a given quality of water so that self-cleaning would not proceed further once self-cleaning has been completed for a predetermined period. Accordingly, it is preferable to cumulate the duration of electrolysis in the respective modes with each other while imposing an upper limit upon them.

The time period necessary for self-cleaning is dependent on the quality of water, more particularly, the hardness of water. Thus, longer time will be required for hard water which facilitates precipitation of the scales whereas shorter time will suffice for soft water. Accordingly, in another preferred embodiment of the invention, the control means derives a variable which varies in accordance with the hardness of water, the control means being operable to cumulate the duration of electrolysis in alkaline water supply mode and the duration of electrolysis in acidic water supply mode by countervailing them with each other within a limit of the variable, the control means operating to apply between the electrodes at a predetermined timing a DC potential of a polarity opposite to the polarity that corresponds to the cumulated duration. With this arrangement, the reverse potential descaling is carried out in an ideal manner.

These features and advantages of the invention as well as other features and advantages thereof will become apparent from the following description.

BEST MODE FOR CARRYING OUT THE INVENTION

Figure 1:
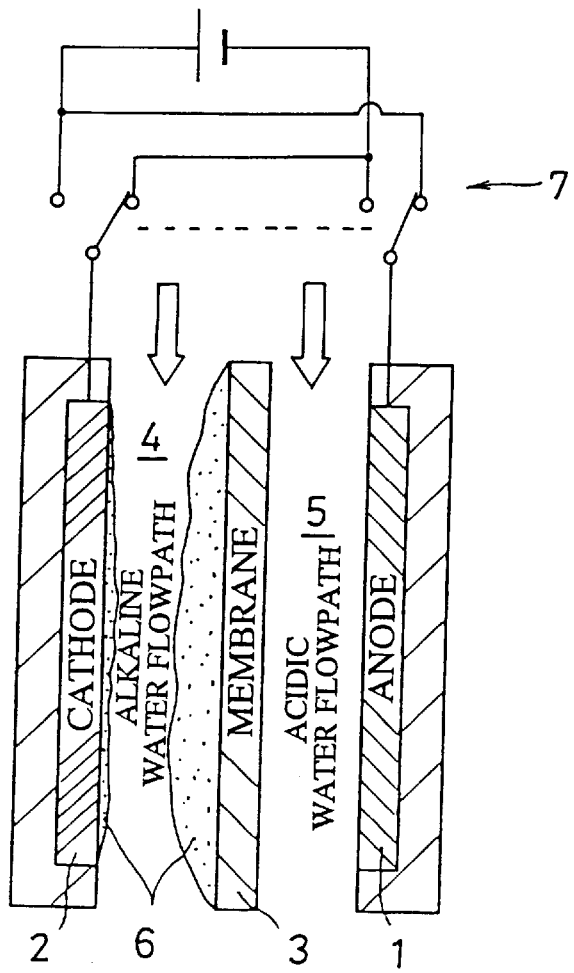
FIG. 1 is a schematic cross-sectional representation of the conventional membrane-type electrolytic cell.
Figure 2:
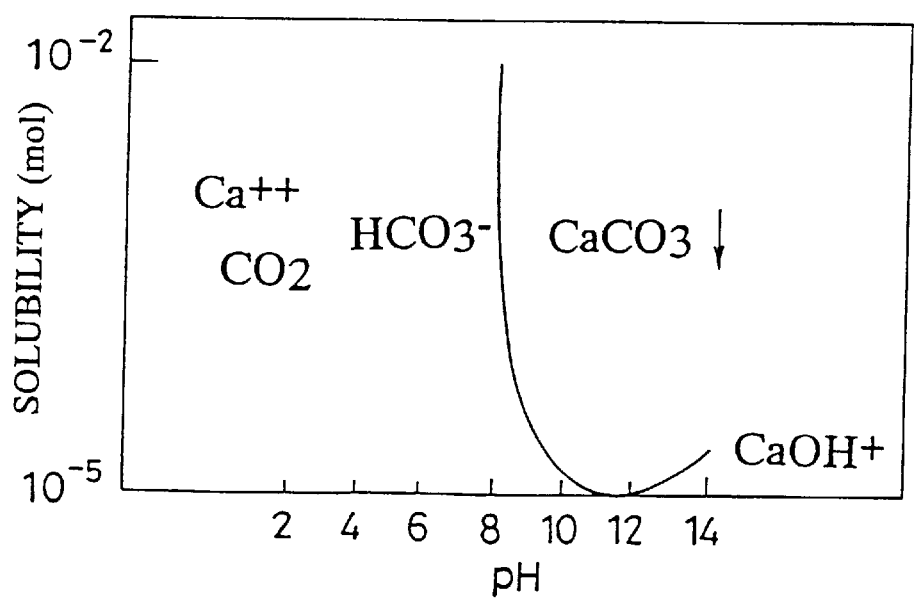
FIG. 2 is a graph showing the apparent solubility of calcium carbonate versus pH.
Figure 3:
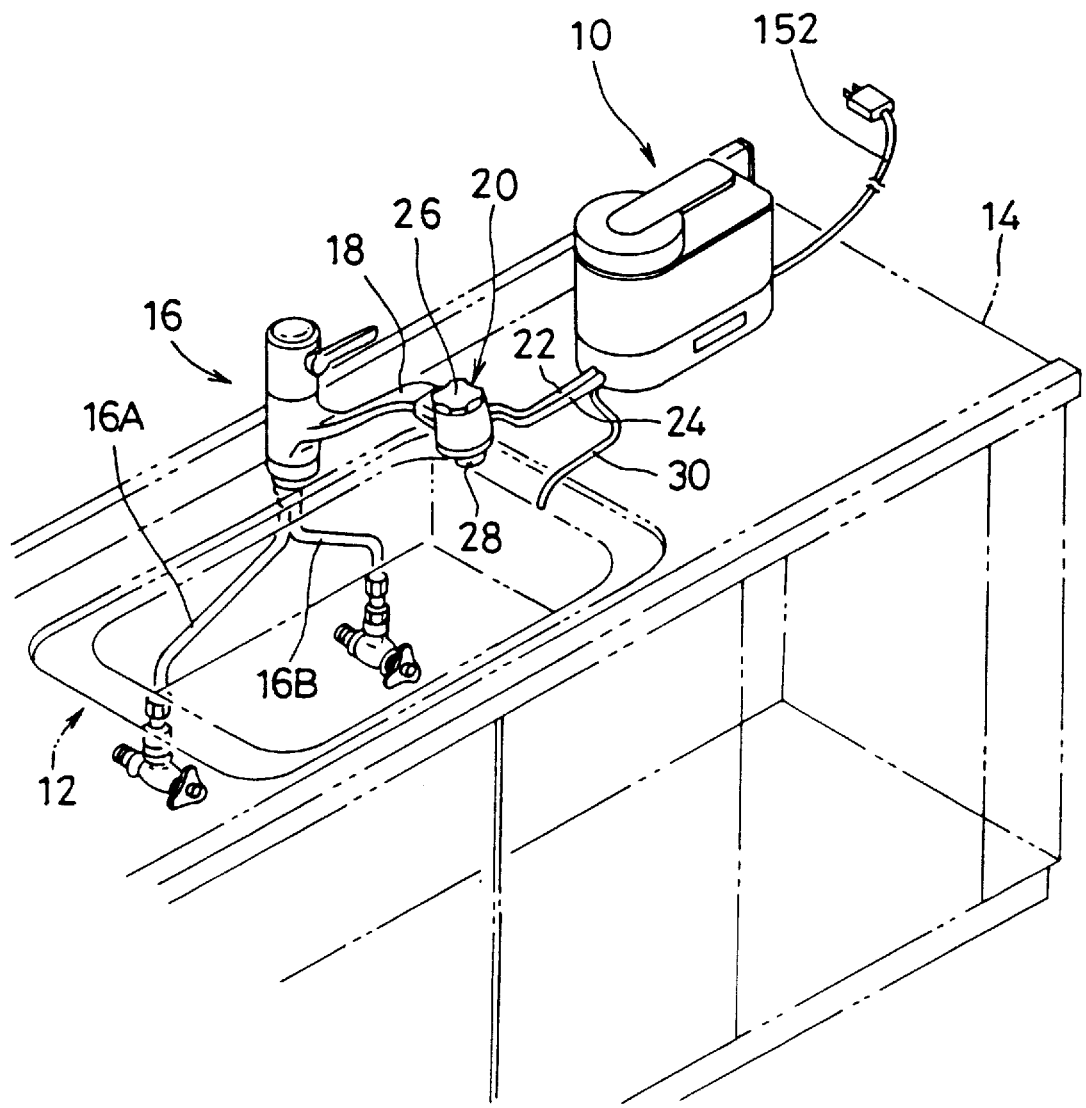
FIG. 3 is a perspective view showing the mode of use of a water processing unit wherein the water electrolyzer according to the invention is incorporated.

In FIG. 3, there is shown a water electrolyzer embodying the invention as incorporated in a water purifier for home use. Referring to FIG. 3, the water processing unit 10 is designed for use as it is placed, for example, on a kitchen counter 14 equipped with a sink 12. In the illustrated layout, the sink is provided with a mixing valve 16 of the single-lever type to which hot water from a boiler (not shown) is supplied via a hot water piping 16A and tap water is applied through a water piping 16B connected to the public water line (not shown).

Spout 18 of the mixing valve 16 is provided with a faucet adapter 20 wherein a flow control valve mechanism is arranged, the adapter 20 being connected to the processing unit 10 through a tap water supply hose 22 and a processed water delivery hose 24. Upon rotating a handle 26 of the adapter 20 into a predetermined angular position, tap water from the mixing valve 16 will be forwarded through the supply hose 22 to the processing unit 10 and water after treatment will be returned via the delivery hose 24 to the adapter 20 for delivery through an outlet 28. Upon turning the handle 26 into another position, non processed water or a mixture thereof with hot water coming from the mixing valve 16 will be directly delivered from the outlet 28 of the adapter 20 upon bypassing the processing unit 10. Connected further to the processing unit 10 is a drain hose 30 which is adapted to discharge to the sink 12 waste water, hot water and steam occurred or generated in the processing unit 10.

Figure 4:
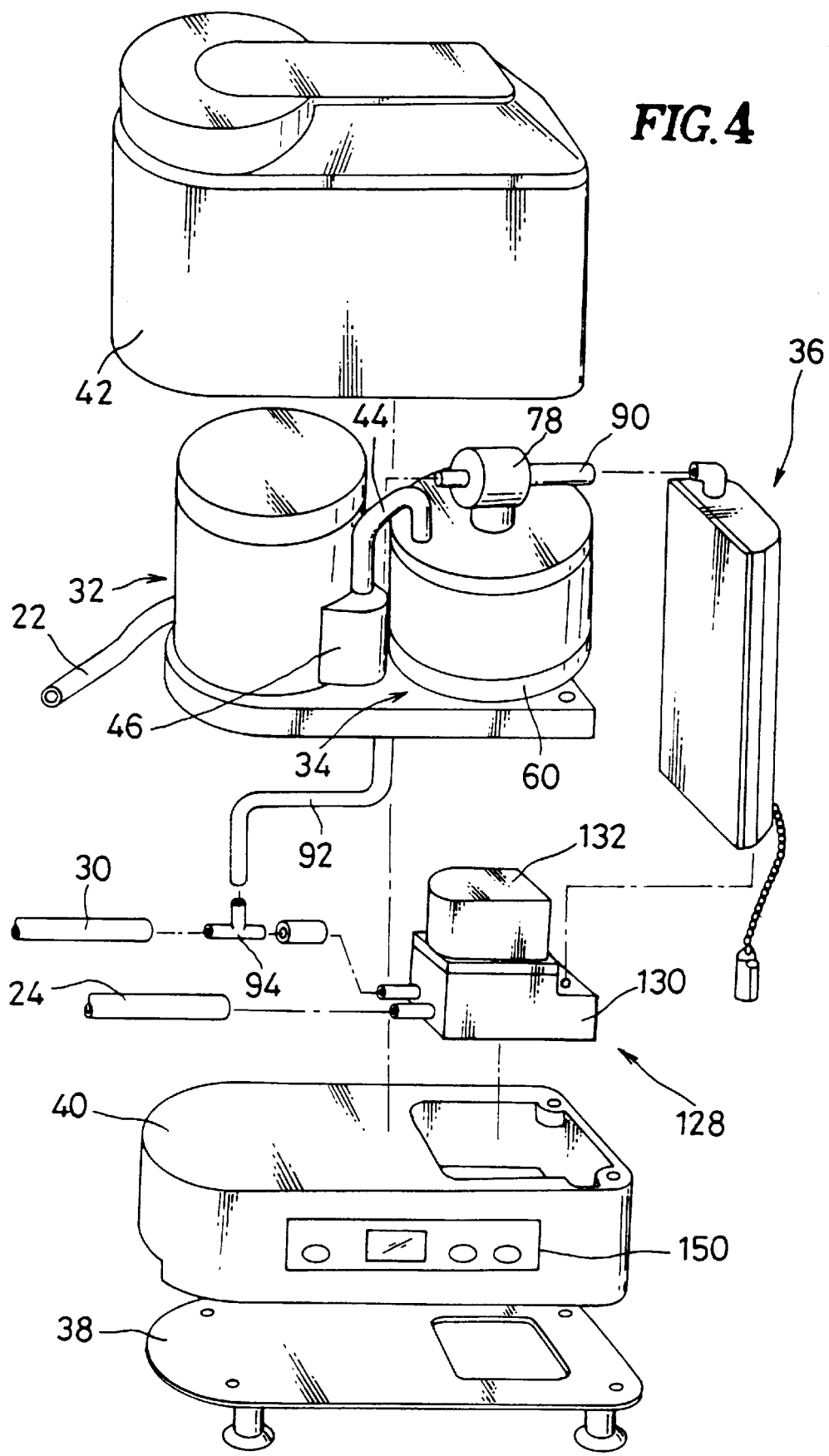
FIG. 4 is an exploded perspective view of the unit shown in FIG. 3.

Referring to FIG. 4, the water processing unit 10 is designed and constructed such that any particulate matters, such as ferrous rust and microorganisms, which are born in tap water are first removed by filtration, that any harmful or undesirable substances such as residual chlorine, trihalomethanes and smelly substances which are dissolved in tap water are then removed under the adsorption action of activated carbon, and that the thus purified water is further subjected to electrolysis to produce acidic and/or alkaline water at the user's discretion. To this end, the water processing unit 10 is comprised of a filtration stage 32 wherein a filter (not shown) such as hollow-fiber membrane filter is received, an adsorption stage including an activated carbon cartridge 34 wherein fibrous or granular activated carbon is received, and an electrolytic cell 36 for generating acidic or alkaline water. These components parts of the water processing unit are supported by a base 40 having a bottom plate 38 and are enclosed by an outer casing 42.

Tap water from the mixing valve 16 is forwarded via the supply hose 22 to the filtration stage 32, with filtered water being delivered through a hose 44 to the activated carbon cartridge 34. A conventional flow-rate sensor 46 is arranged at the outlet of the filtration stage 32 to detect the flow rate of water flowing through the water processing unit 10. The flow rate sensor 46 is also used to detect the presence or absence of water feed to the processing unit 10 and, therefore, may be arranged in any other suitable location or may be replaced by a pressure sensor or pressure switch.

Figure 5:
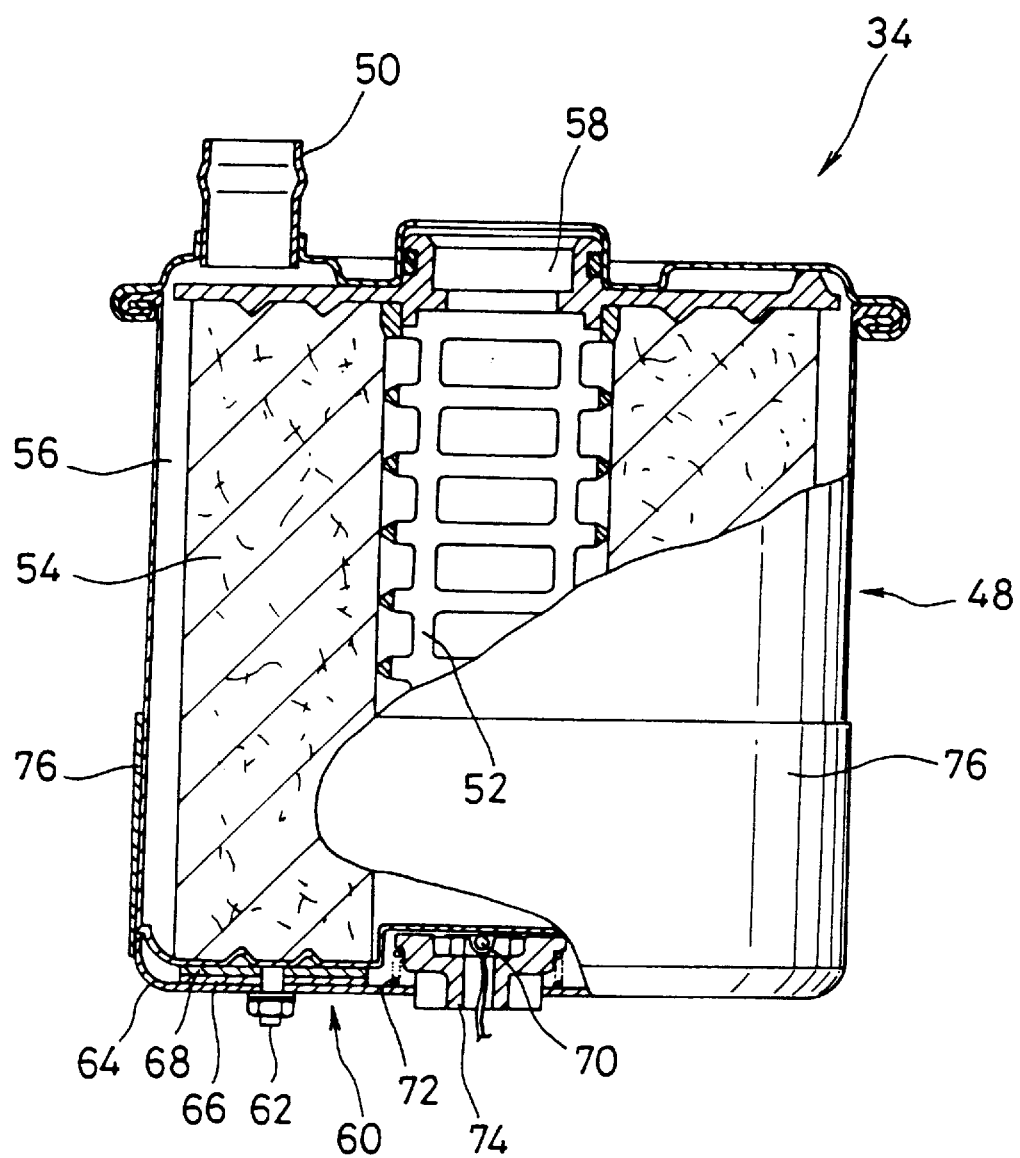
FIG. 5 is a cross-sectional view, partly cut away, of an activated carbon cartridge of the unit shown in FIG. 4.

As shown in FIG. 5, the activated carbon cartridge 34 includes a container 48 made by curling of stainless steel sheet and is provided with an inlet 50 to which the hose 44 is connected. Arranged at the center of the container 48 is a core frame 52 in the form of a skeleton, around which is fixed an activated carbon element 54 made by mold forming of activated carbon fibers bound by a heat-resistive binder. Tap water as entered from the inlet 50 into the cartridge 34 will be distributed over an annular space 56 and will be purified as it flows across the element 54 and will be delivered out of an outlet 58 of the container.

The activated carbon cartridge 34 is designed to be heated at a desired timing whereupon the activated carbon element 54 is boiled and sterilized, and chlorine and trihalomethanes adsorbed by the element are desorbed whereby activated carbon is regenerated. To this end, the cartridge 34 is provided with an electric heater 60 fixed to the bottom thereof to ensure that the cartridge 34 is heated at its bottom when the heater is energized. A plurality of screws 62 are welded or soldered to the bottom plate of the container 48 and the heater 60 is fastened thereto by nuts. The heater 60 may be comprised of a cup-shaped metallic heat radiator plate 64 and a heat generation member 66 which may be a sheathed heater or a mica heater wherein nichrome wires are interleaved between mica foils. Preferably, a heat transfer aluminum plate 68 is sandwiched between the heated member 66 and the bottom of the container to ensure that heat of the heated member is conveyed well to the container.

The container 48 has at its center a raised bottom portion to which a thermistor 70 is brought into thermal contact in order to detect the temperature of the raised bottom portion. The thermistor 70 is held into resilient contact with the central raised bottom portion by a thermistor holder 74 which, in turn, is supported through a coil spring 72 by the heat radiator plate 64. Preferably, an aluminum foil adhesive tape 76 is affixed over the juncture of the container 48 and the heat radiator plate 64 to ensure that heat of the heater is transferred well to the activated carbon cartridge 34.

Figure 6:
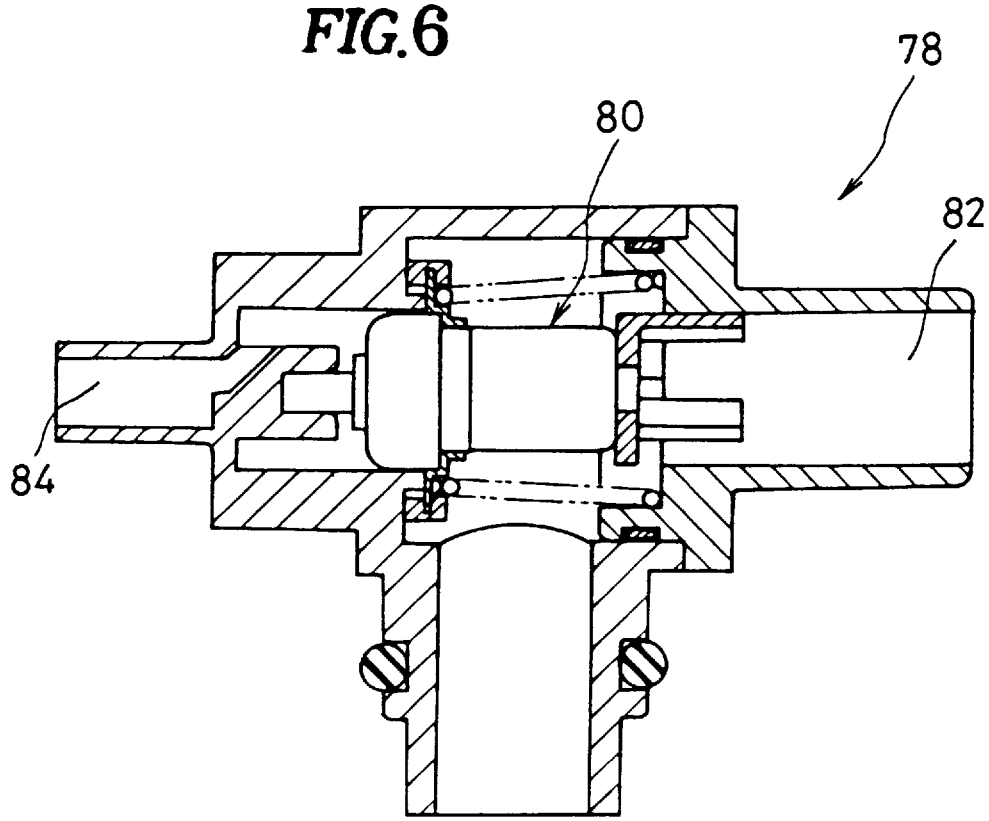
FIG. 6 is a cross-sectional view of a temperature-responsive direction control valve of the unit shown in FIG. 4.
Figure 7:
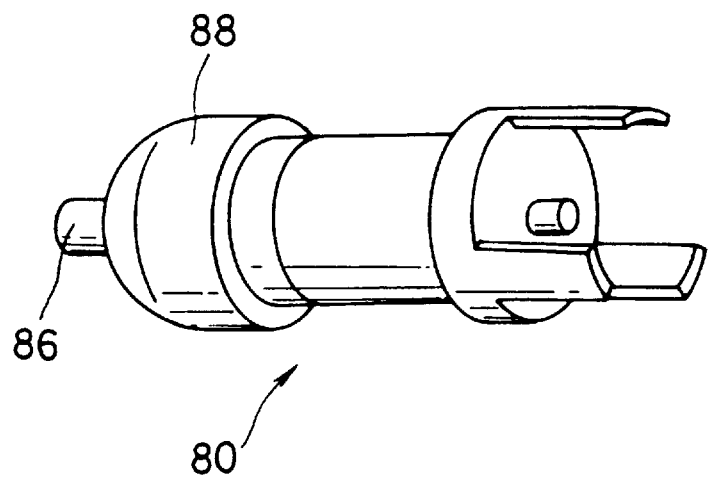
FIG. 7 is a perspective view of a temperature sensitive element of the temperature responsive direction control valve shown in FIG. 6.

Referring to FIG. 4, a direction control valve 78 is arranged at the outlet 58 of the cartridge 34 so as to discharge hot water and steam generated during regeneration of activated carbon through the drain hose 30 toward the sink 12. The direction control valve 78 is of the temperature responsive type and is so designed that the outlet thereof is automatically switched over in response to the temperature of hot water and steam issuing from the cartridge 34. As shown in FIGS. 6 and 7, the direction control valve 78 includes a movable member 80 incorporating a temperature responsive element made of a thermally expansive wax composition, an outlet 82 for purified water and an outlet 84 for hot water. The direction control valve 78 is designed such that in response to a rise in the ambient temperature a spindle 86 is protruded to move a valve member 88 to the right as viewed in FIG. 6 to thereby permit hot water and steam coming from the cartridge 34 to issue toward the hot water outlet 84. The direction control valve 78 may be adjusted in such a manner that fluid flow is directed to the purified water outlet 82 when the ambient temperature is less than 60° C. but is forwarded to the hot water outlet 84 when the ambient temperature exceeds 60° C. As shown in FIG. 4, the purified water outlet 82 of the direction control valve 78 is connected through a hose 90 to the electrolytic cell 36, with the hot water outlet 84 being connected through a hot water drainage hose 92 and a T-joint 94 to the drain hose 30.

Figure 8:
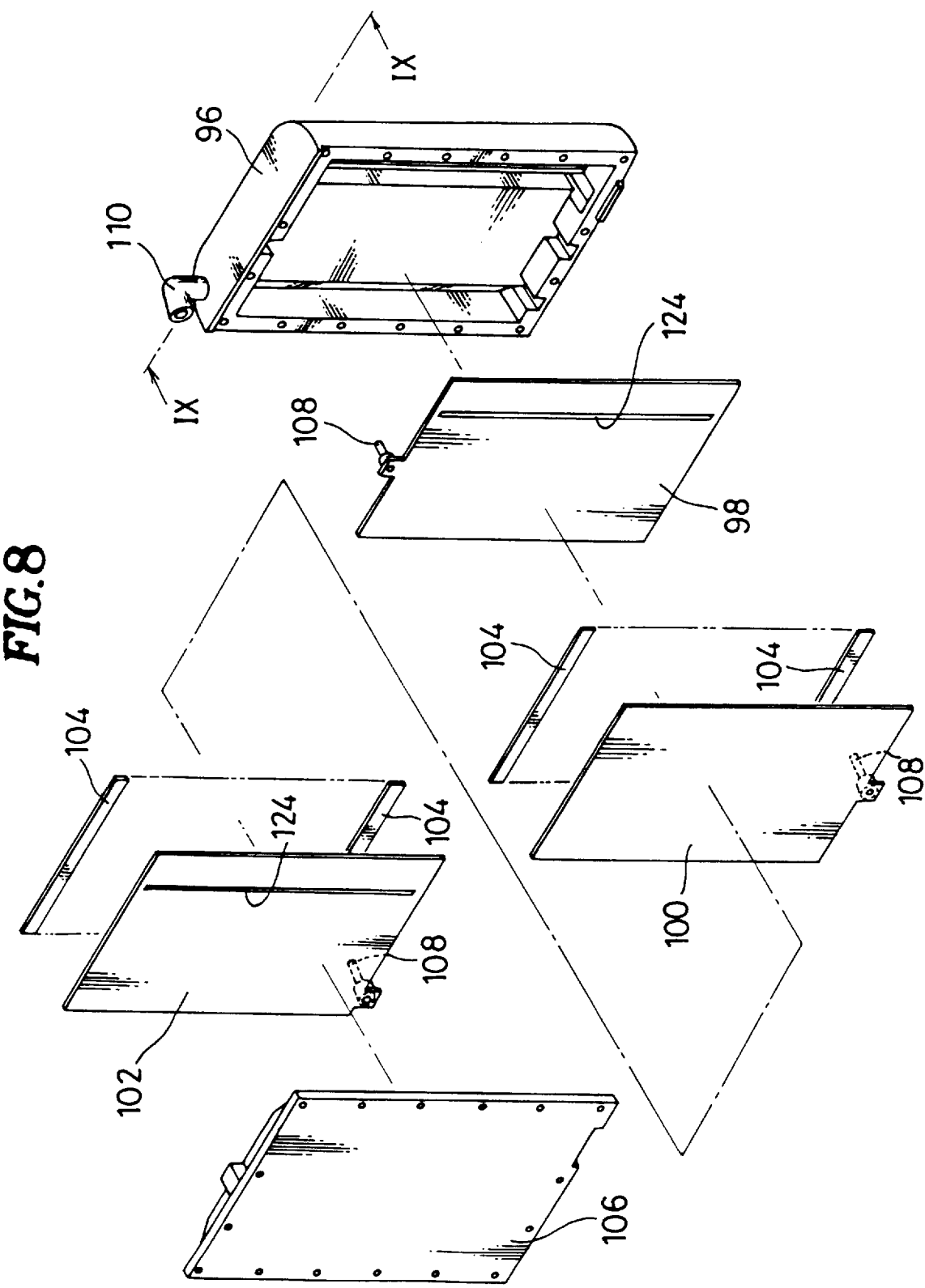
FIG. 8 is an exploded perspective view of the electrolytic cell shown in FIG. 4.

When the water processing unit 10 is operated, purified water issuing from the activated carbon cartridge 34 is forwarded to the electrolytic cell 36. Referring to FIGS. 8–13, an embodiment of the electrolytic cell 36 will be described by way of an example. In the illustrated embodiment, the electrolytic cell 36 is of the non-membrane type and includes an elongated pressure-resistive casing 96 made of rigid plastics. As best shown in FIG. 8, the cell 36 is assembled by placing, in sequence, three planar electrodes (i.e., a first lateral electrode 98, a central electrode 100 and a second lateral electrode 102) in a recess of the casing 96 with a plurality of plastic spacers 104 sandwiched therebetween, followed by fluid tightly fastening a cover 106 by screws to the casing 96. Because a pair of lateral electrodes are arranged on both sides of the central electrode 100, the cell 36 of this embodiment advantageously has a double cell structure. Each of the electrodes may be made of titanium plate coated with platinum. A terminal 108 is fixed to each of the electrodes for electrical connection to a DC power source via an electric cord. In a mode wherein alkaline water is to be produced, an electric potential is applied in such a polarity that the lateral electrodes 98 and 102 serve as the anode and the central electrode 100 acts as the cathode. In another mode wherein acidic water is to be obtained, the electric potential is applied in the opposite polarity.

Figure 9:
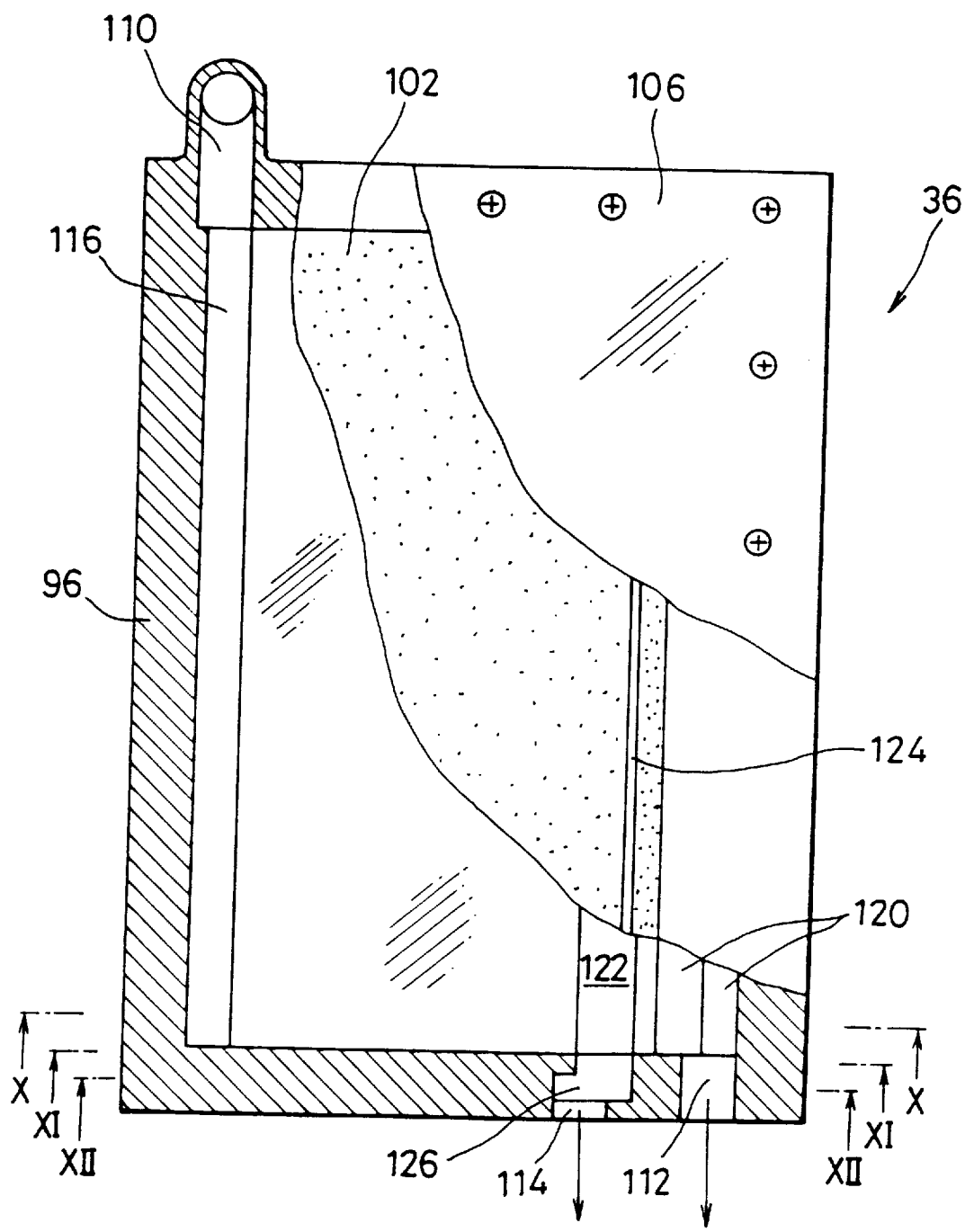
FIG. 9 is a cross-sectional view taken along the line IX—IX of FIG. 8 and showing the electrolytic cell as assembled.
Figure 10:
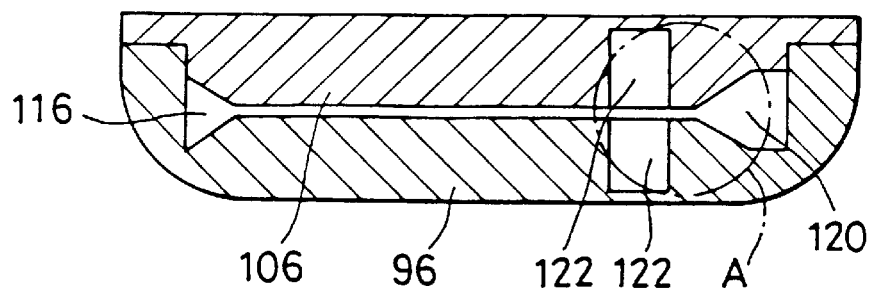
FIG. 10 is a cross-sectional view taken along the line X—X of FIG. 9, with electrodes and spacers being omitted for simplicity.
Figure 11:
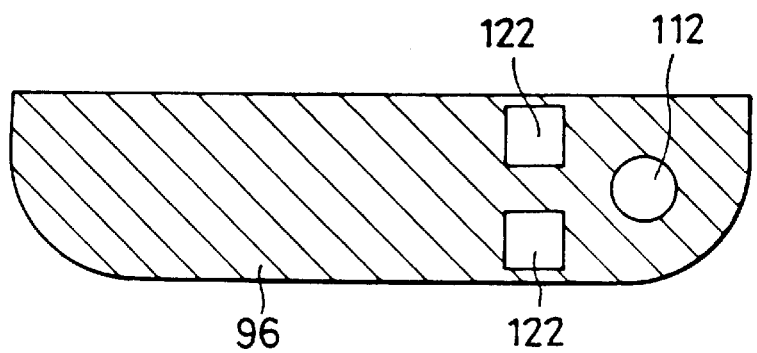
FIG. 11 is a cross-sectional view taken along the line XI—XI of FIG. 9.
Figure 12:
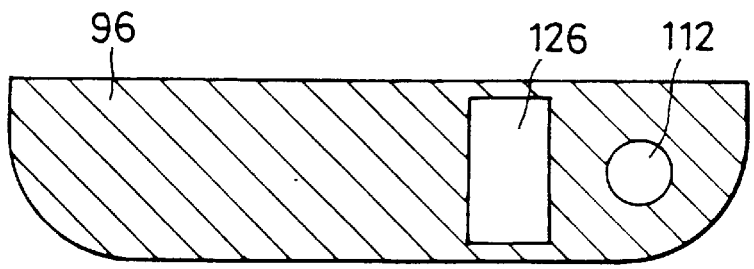
FIG. 12 is a cross-sectional view taken along the line XII—XII of FIG. 9.

As shown in FIG. 9, the casing 96 has an inlet 110 for purified water, a first outlet 112 for electrolyzed water, and a second outlet 114 for electrolyzed water, the first outlet operating as the outlet for alkaline water in the alkaline water supply mode but operating as the outlet for acidic water in the acidic water delivery mode, the second outlet serving as the outlet for acidic water in the alkaline water delivery mode but serving as the outlet for alkaline water in the acidic water delivery mode. The inlet 110 is in fluid communication with a plenum chamber or water distribution passage 116 of a generally triangular cross-section. As best shown in FIG. 10, the plenum chamber 116 is defined by the casing 96 and the cover 106 and extends throughout the entire vertical length of the electrodes.

Figure 13:
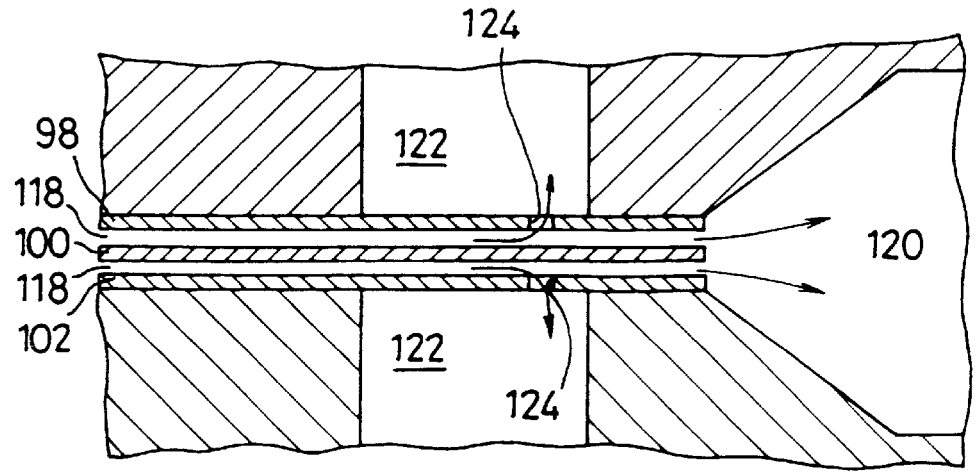
FIG. 13 is an enlarged view showing a part encircled by the circle A in FIG. 10.
Figure 14:
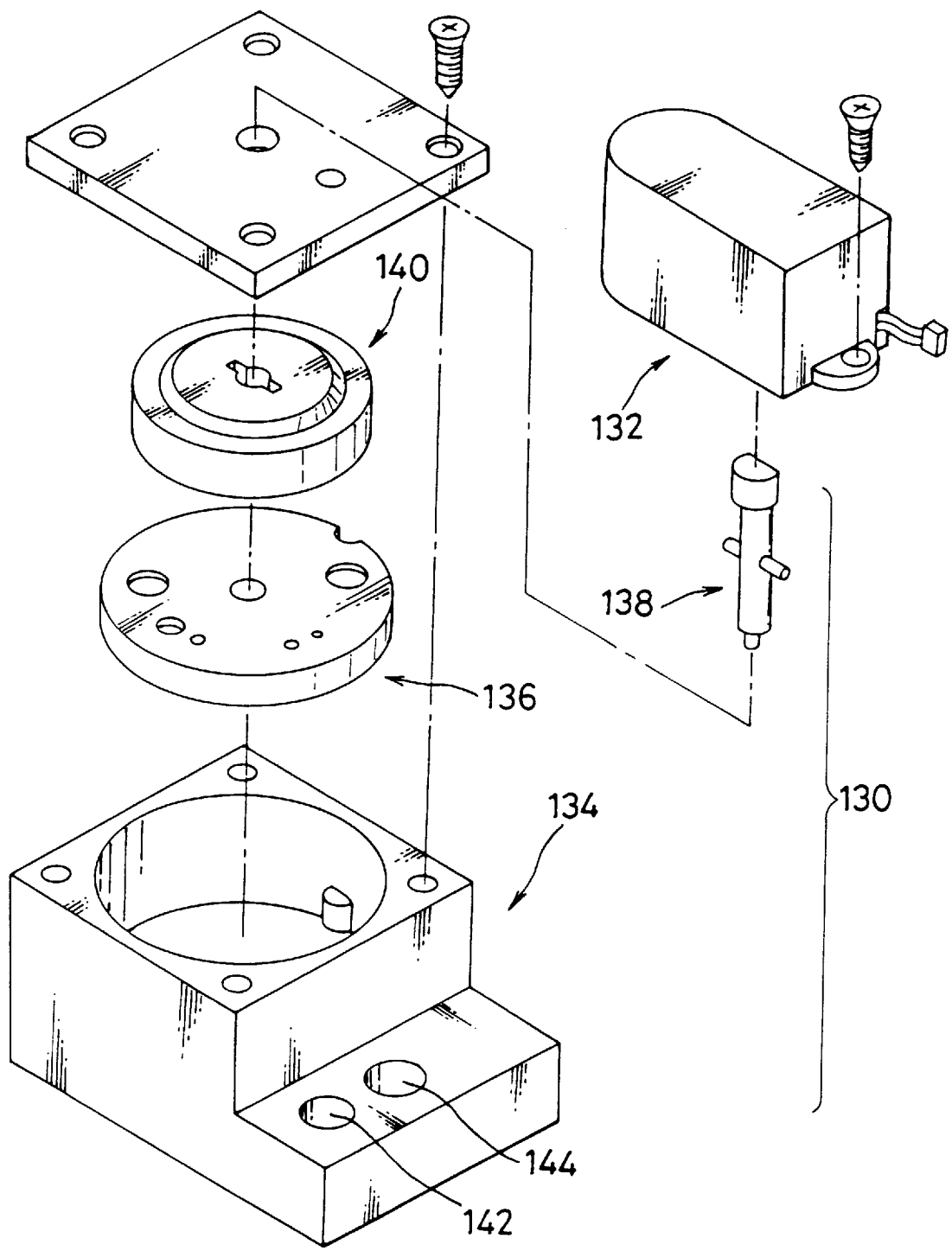
FIG. 14 is an exploded perspective view of a control valve shown in FIG. 4.
Figure 15:
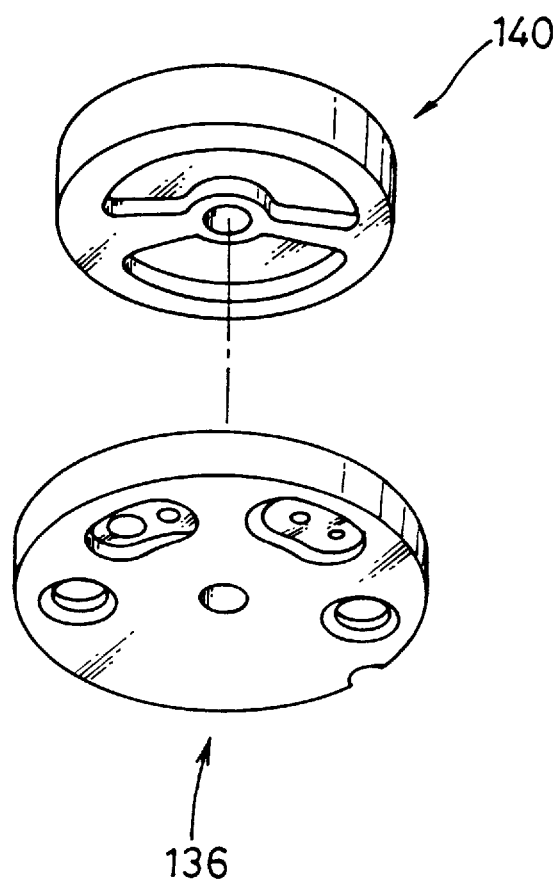
FIG. 15 is a perspective view as viewed from below showing a stationary member and a rotary disk of the control valve shown in FIG. 14.
Figure 16:
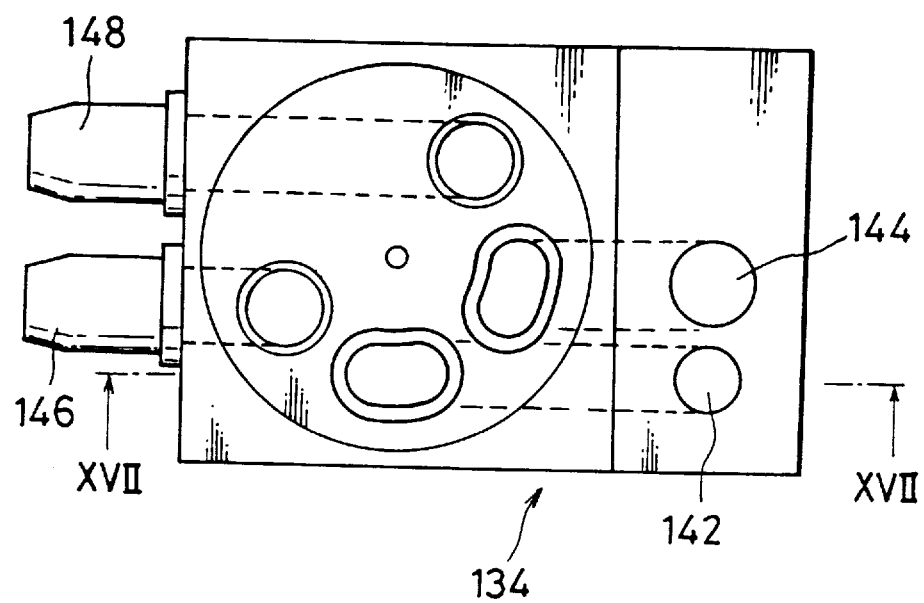
FIG. 16 is a top plan view of a housing of the control valve shown in FIG. 14.
Figure 17:
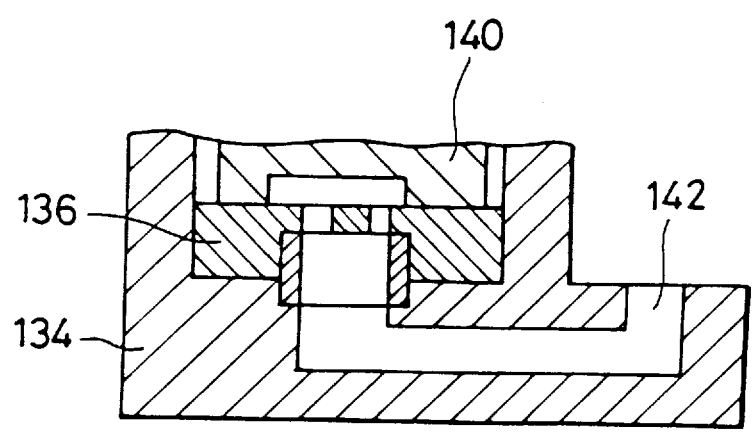
FIG. 17 is a cross-sectional view taken along the line XVII—XVII of FIG. 16.

As shown enlarged in FIG. 13, a pair of flow paths 118 are formed on both sides of the central electrode 100. Each of the flow paths concerts with the electrodes to operate as the electrolytic chamber. A plurality of horizontally extending spacers 104 are sandwiched between the electrodes to ensure that water coming from the inlet 110 and flowing down along the plenum chamber 116 flows into the flow paths 118 in the horizontal direction as shown in FIG. 13. Since the electrode spacing is made sufficiently small, a laminar flow will be established in the flow of water flowing through the flow paths 118 in the horizontal direction. Accordingly, acidic water and alkaline water which are generated respectively along the surfaces of the electrodes by electrolysis can be recovered separately, without providing a membrane between electrodes.

Electrolyzed water produced along the surfaces of the central electrode 100 is collected in a first collection passage 120 for electrolyzed water and is delivered through the first outlet 112. The first collection passage 120 is defined by the casing 96 and the cover 106 and extends throughout the entire vertical length of the electrodes in a manner similar to the plenum chamber 116. Electrolyzed water produced along the surfaces of the lateral electrodes 98 and 102 is recovered in second collection passages 122 for electrolyzed water. To this end, each of the lateral electrodes is provided with a slit 124 to ensure that the flow of electrolyzed water flowing along the surfaces of the lateral electrodes 98 and 102 is directed to flow into the second collection passages 122. Electrolyzed water recovered in the second collection passages 122 is forwarded to a connection port 126 for delivery from the second outlet 114.

Referring again to FIG. 4, a valve unit 128 is connected to the bottom of the electrolytic cell 36 so as to control the direction of two kinds of electrolyzed water (acidic water and alkaline water) flowing out of the outlets 112 and 114 of the cell 36. The valve unit 128 may be comprised of a flow control valve 130 and an electric motor 132 with a reduction gear mechanism. An example of the flow control valve 130 is shown in FIGS. 14–17.

Referring to FIGS. 14–17, the control valve 130 includes a housing 134, a stationary member 136 positioned within the housing, and a rotary disc 140 rotated through a shaft 138 by the motor 132. The housing 134 is provided with a first inlet 142 connected to the first outlet 112 of the electrolytic cell 36, a second inlet 144 connected to the second outlet 114 of the cell 36, a serviceable water outlet 146, a drain outlet 148, and internal passages therefor. The stationary member 136 and the rotary disc 140 are formed with various ports and recesses as shown to ensure that, according to the angular position of the rotary disc 140, the entire amount of water incoming from the outlets 112 and 114 of the cell 36 is directed toward the serviceable water outlet 146 or drain outlet 148 or, alternatively, electrolyzed water issuing from the first outlet 112 of the cell 36 is forwarded to the serviceable water outlet 146 while electrolyzed water issuing from the second outlet 114 is delivered to the drain outlet 148. The serviceable water outlet 146 of the control valve 130 is connected to the delivery hose 24 and the drain outlet 148 is connected to the drain hose 30.

Referring further to FIG. 4, a control and display section 150 is provided at the base 40 of the processing unit 10. Also arranged within the base 40 is a control unit, described later, which is designed to control the electric heater 60 for regenerating the activated carbon of the processing unit 10, the electrolytic cell 36 and the motor 132 of the control valve 130. Electric power is supplied to the control unit through a cable 152 (FIG. 3).

Figure 18:
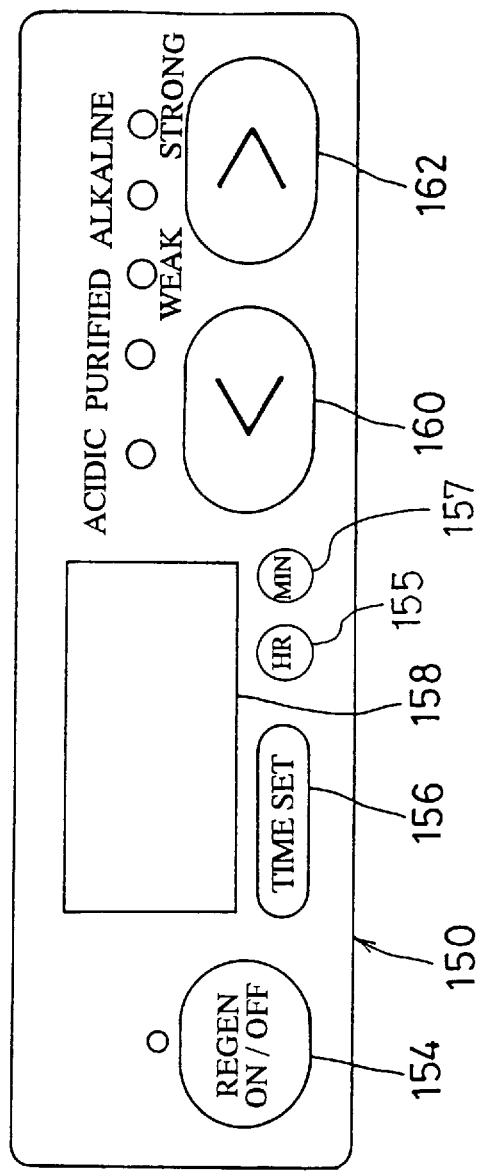
FIG. 18 illustrates an exemplary layout of a control and display panel of the water processing unit.

An example of the layout of the control and display section 150 is shown in FIG. 18. The control and display 150 may include a manual regeneration control switch 154 for commencing regeneration of activated carbon in the cartridge 34 in accordance with the instructions of the user, a regeneration-time-set-mode selection switch 156 to enable the user either to select a regeneration time which is set by default or to change the regeneration time set by default, regeneration time set switches 155 and 157 for incrementing the regeneration time, a liquid crystal display panel 158, selection switches 160 and 162 to enable the user to select the kind of water to be delivered, and light emitting diodes 164 for indicating the selected water.

In the illustrated layout, the control and display section 150 is designed such that by operating the selection switch 160 or 162 the user may select either purified water processed by the filter 32 and the activated carbon cartridge 34, or acidic or alkaline water obtained by subjecting purified water further to electrolysis. The pH of alkaline water may be adjusted in three different levels including strong, medium and weak. The arrangement may be such that, for example, weakly acidic water of pH 6.5 is obtained in the acidic water delivery mode, whereas alkaline water of pH 8.5, pH 9.0 or pH 9.5 is obtained in the alkaline water delivery mode.

Figure 19:
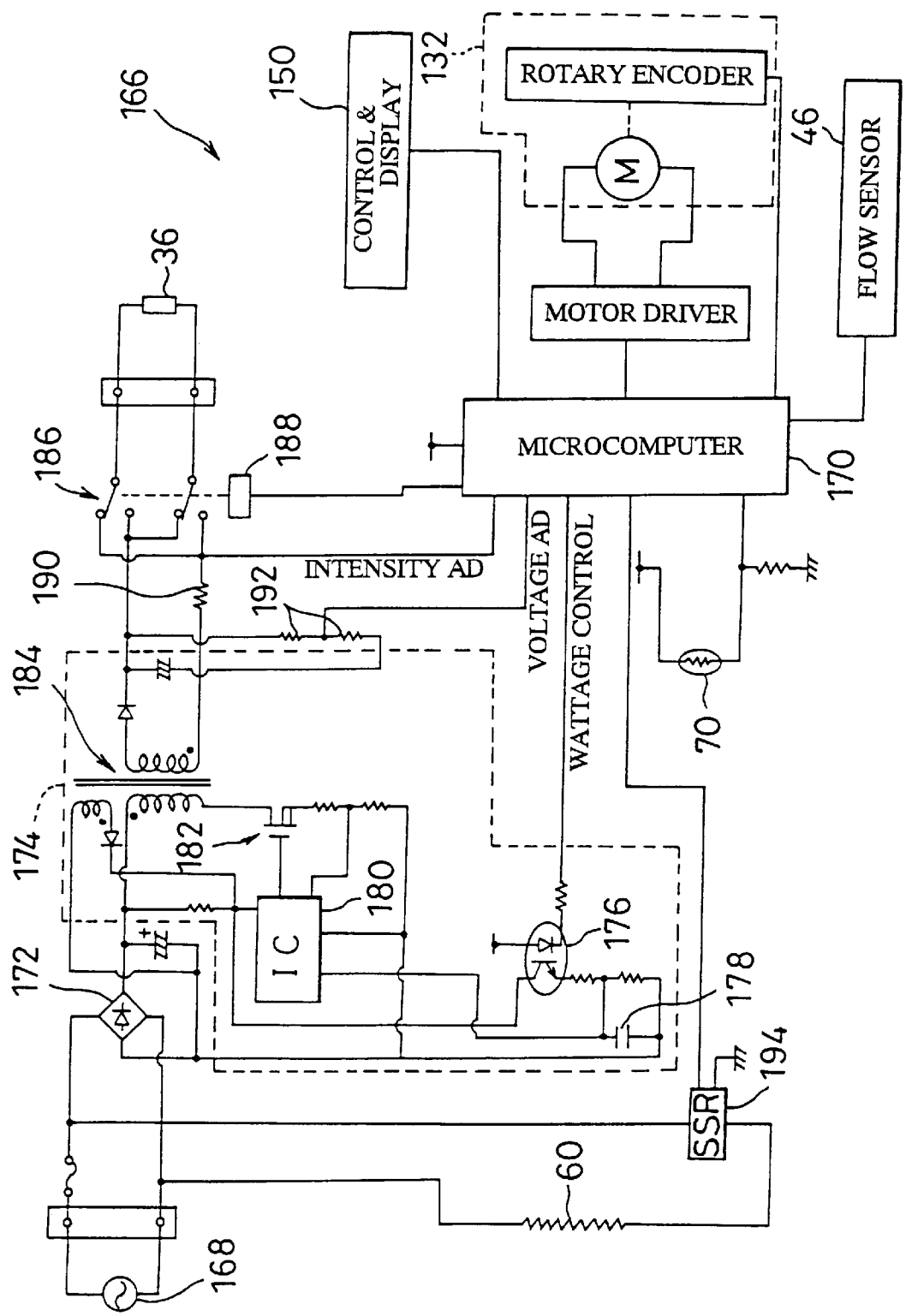
FIG. 19 is a block diagram of the control unit of the water processing unit.

In FIG. 19, there is shown an embodiment of the control unit of the water processing unit 10. An electric power is applied to the control unit 166 from a commercial AC power source 168 via the cable 152 (FIG. 3). The control unit 166 includes a programmed microcomputer 170 which is programmed in such a manner as to control the power as well as the polarity of the direct current supplied to the electrolytic cell 36, to control the motor 132 for switching over the destination of water delivered from the cell 36, and to control the power supply to the heater 60 intended to regenerate the activated carbon cartridge 34.

The control unit 166 has a diode bridge 172 for full-wave rectifying the alternating current from the power source 168 and a switching power circuit 174. Briefly, the control unit 166 is designed and constructed such that in accordance with various operating parameters the microcomputer 170 theoretically computes the desired power consumption of the electrolytic cell 36 and that the microcomputer 170 feedback controls the switching power circuit 174 in such a manner that the power actually supplied to the cell is equal to the desired power consumption. More specifically, the switching power circuit 174 includes a photocoupler 176, a capacitor 178 for smoothing the output of the latter, an integrated circuit 180 having a pulse width modulation function, a switching transistor 182 and a switching transformer 184.

The alternating current from the domestic power source 168 is full-wave rectified by the diode bridge 172, the DC output of which is applied to the primary winding of the switching transformer 184. The pulse width of the direct current flowing the primary windings of the switching transformer 184 is controlled by the switching transistor 182 driven by the IC 180 in such a manner that an electric current having a wattage proportional to the pulse duty of the primary windings is induced in the secondary winding of the switching transformer 184. The secondary winding of the switching transformer 184 is connected to the electrodes of the electrolytic cell 36 through a reversal switch 186 designed to reverse the polarity of the voltage. The reversal switch 186 is controlled by a relay 188 which is in turn controlled by the microcomputer 170. The reversal switch 186 is biased to a position in which the central electrode 100 becomes negative when the relay 188 is not energized and is adapted to be switched over upon energization of the relay 188.

A resistor 190 for detecting the intensity of current flowing through the cell is connected in series to the lead wires connecting the cell 36 and the switching transformer 184, and a pair of resistors 192 for detecting the voltage applied to the cell are connected in parallel to the lead wires. The junctions to these resistors 190 and 192 are connected to input terminals of analog-to-digital converter of the microcomputer to ensure that the microcomputer 170 periodically checks the potential at these junctions to detect the intensity and the voltage of electric current supplied to the electrolytic cell.

The control unit 166 further includes a solid state relay (SSR) 194 for controlling power supply to the heater 60 for regenerating activated carbon, the relay being adapted to be controlled by the microcomputer 170. The output signals of the thermistor 70 and the flow-rate sensor 46 are sent to the microcomputer 170. The microcomputer 170 further controls the geared motor 132 through a motor driver. A rotary encoder incorporated in the motor detects the rotational angular position of the motor and delivers a corresponding signal to the microcomputer 170. The microcomputer 170 controls the motor in accordance with the signals from the rotary encoder to, in turn, control the rotary control valve 130 whereby the destination of two kinds of electrolyzed water (acidic water and alkaline water) flowing out of the outlets 112 and 114 of the cell 36 is changed over.

The mode of operation as well as the mode of use of the water processing unit 10 will now be described with reference to the operation of the microcomputer 170 illustrated in the flowcharts shown in FIG. 20A and ensuing drawings. Briefly, in the example shown in the flowcharts, the microcomputer 170 is programmed such that electric power is supplied to the heater 60 to heat the cartridge 34 to thereby sterilize by boiling and to regenerate the activated carbon everyday automatically whenever the predetermined time which is preset by the user for regeneration of activated carbon has arrived, as well as each time the user has pressed on the manual regeneration start switch. The time for activated carbon regeneration is set in such a manner that, upon connecting the plug of the cable 152 into an associated electrical socket, the time is set by default for 13 hours later, for example. The regeneration time thus set by default may be incremented on the one hour basis or on the one minute basis each time the user presses on the regeneration time set switches 155 or 157 after selecting the regeneration time set mode by pressing on the regeneration-time-set-mode selection switch 156. It is recommended that the activated carbon regeneration time is set for midnight in which it is unlikely that the water processing unit is used.

The microcomputer 170 is also programmed such that, when after regeneration of the activated carbon, water is fed for the first time in the morning of the following day, an electric potential of a polarity opposite to the polarity of the mode in which the electrolytic cell is operated in the preceding day is applied between the electrodes 100 and 98/102 of the cell 36 to remove the scales such as calcium carbonate precipitated on the electrodes. According to the invention, the duration of the reverse potential descaling is varied in response to the hardness of tap water.

Figure 20A:
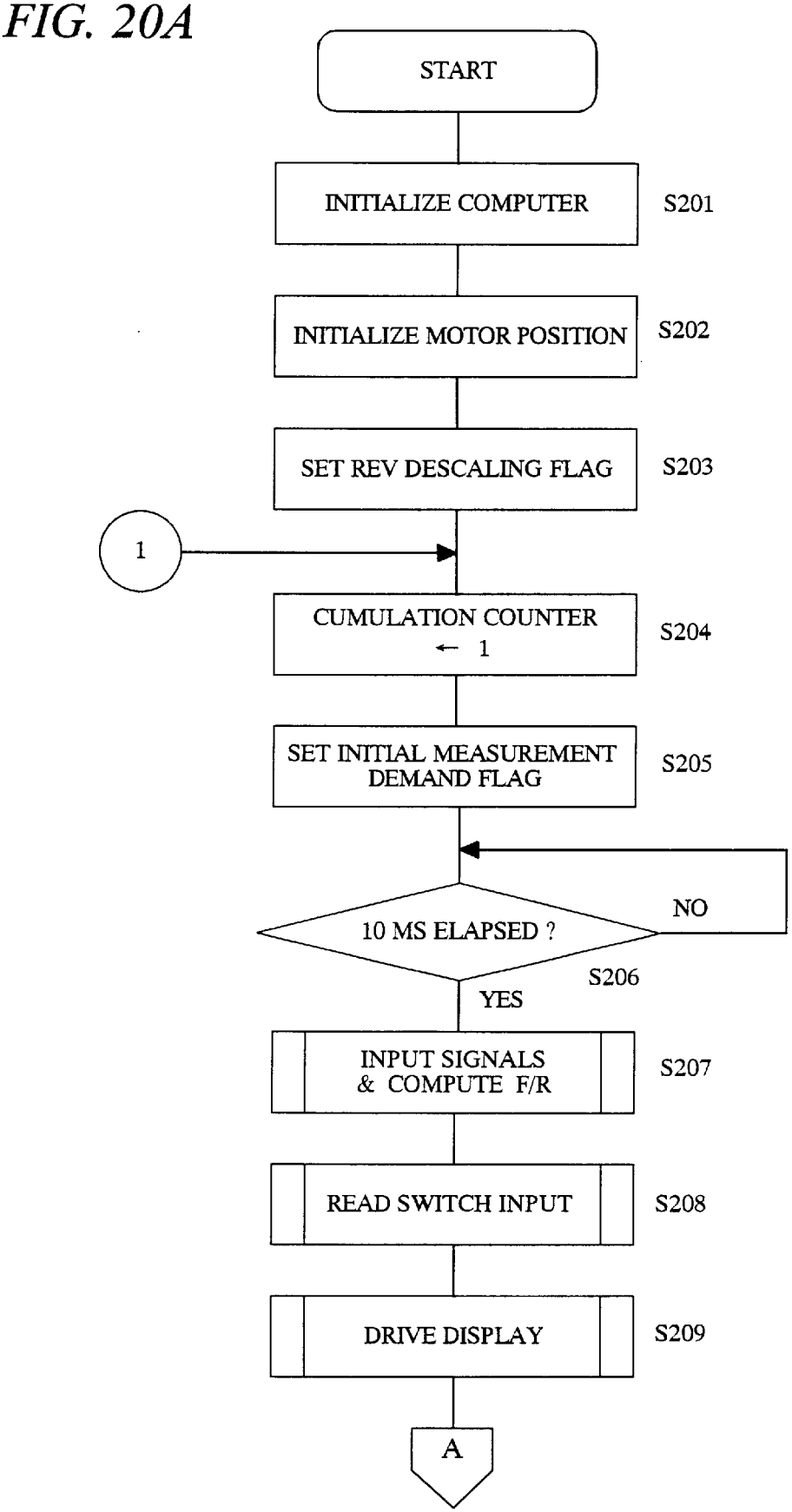
FIGS. 20A–20C are flowcharts showing the main routine of the control unit shown in FIG. 19.

More specifically, referring to the flowcharts shown in FIG. 20A and ensuing drawings, upon engaging the plug of the cable 152 with the socket, the microcomputer 170 is initialized (S201) and the motor 132 is returned to its initial position in which the two outlets 112 and 114 of the electrolytic cell 36 are connected to the drain hose 30 (S202). In the microcomputer initializing sequence (S201), a "regeneration flag" indicative of a demand for activated carbon regeneration (see S211) and an "electric conductivity calculation flag" (S406) indicative of completion of computation of the electric conductivity are reset respectively to "0". In this regard, these flags as well as various other flags, counters and timers described later may be implemented by the microcomputer 170 and its associated memories. A "reverse potential descaling flag" is then set to "1" (S203). The reverse potential descaling flag "1" is intended to mean a demand for the reverse potential descaling while the reverse potential descaling flag "0" indicates that reverse potential descaling need not be carried out.

Then, a suitable number is preliminarily input into a cumulation counter (S204). In this regard, the cumulation counter is intended to sum the duration of electrolysis in the alkaline water delivery mode and the duration of electrolysis in the acidic water delivery mode while countervailing them with each other and is adapted to be incremented when electrolysis is conducted in the alkaline water delivery mode but to be decremented in the acidic water delivery mode, as will be described later in more detail with reference to the flowchart of FIG. 24. At S204, a suitable number (say, 1) is input into the cumulation counter in order to permit measurement of the hardness of water upon commencement of water feed. Then, an initial measurement demand flag, indicating that an initial measurement of the hardness of water is requested, is preliminarily set for "1" (S205) and then S207 and following tasks are repeated, for example, for every 10 milliseconds (S206).

First, the outputs from the thermistor 70, flow rate sensor 46, current detection resistor 190 and voltage detection resistors 192 are input and the flow rate is computed based on the output from the flow rate sensor 46 (S207), followed by reading of the switch inputs of the control and display section 150 (S208) and energization of the display panel (S209).

When after connection of the cable plug the mixing valve 16 is opened to feed water to the processing unit 10, tap water will be purified by the filter 32 and the activated carbon cartridge 34 whereby purified water is forwarded to the electrolytic cell 36. As water feed is sensed in accordance with the signals from the flow rate sensor 46 (S210), the reverse potential descaling flag is checked (S217). Since this flag has already been set to "1" at S203 as mentioned before, a sub-routine sequence for "reverse potential descaling" of electrodes is first carried out upon commencement of water feed (S218) whereby measurement of the electric conductivity of water is performed.

Figure 22A:
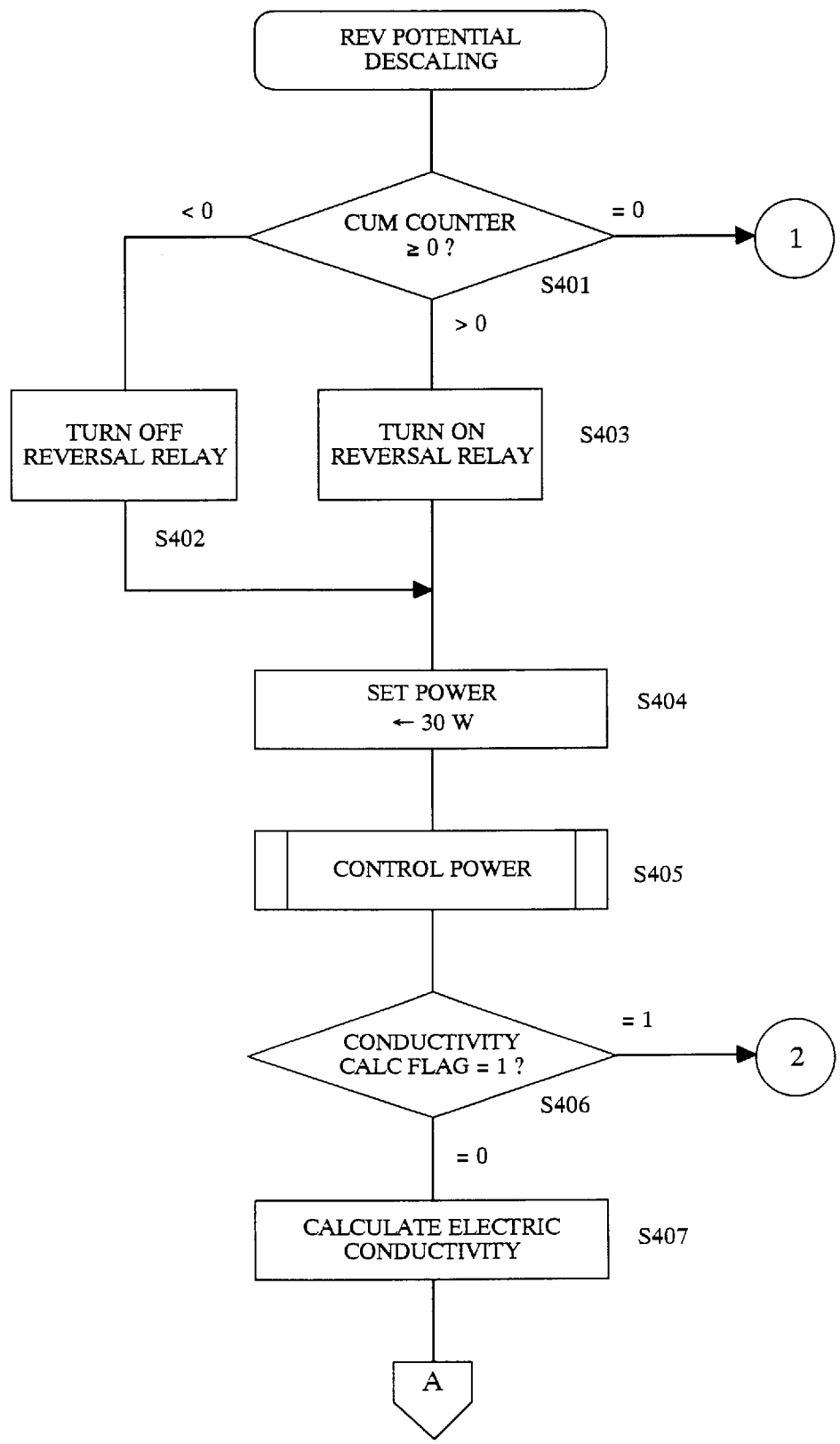
FIGS. 22A and 22B are flowcharts showing a sub-routine for the reverse potential descaling of the electrodes.
Figure 22B:
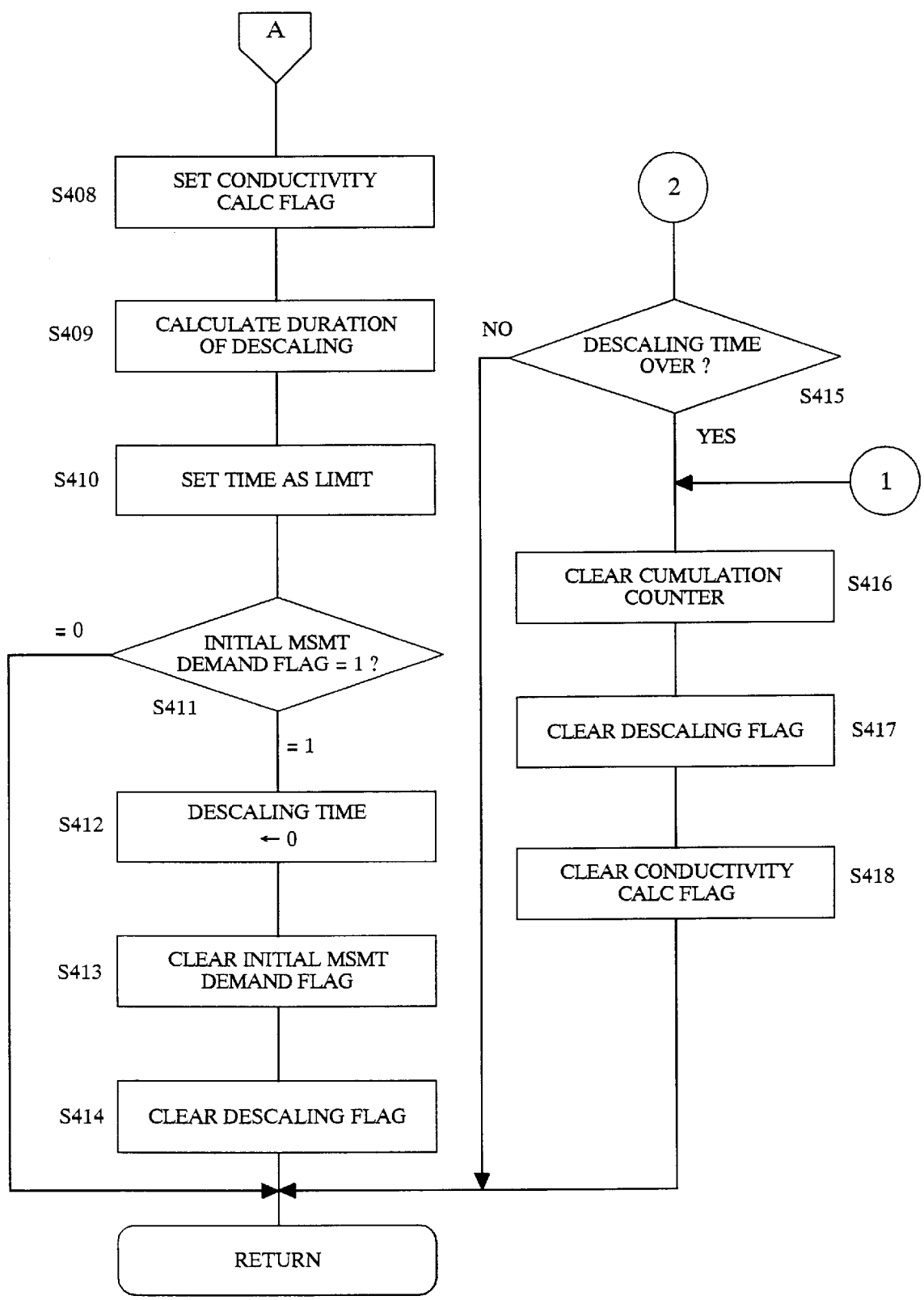

The detail of the reverse potential descaling sub-routine is shown in the flowchart of FIGS. 22A and 22B. Referring to FIGS. 22A and 22B, the value of the cumulation counter is first checked (S401). Because the cumulation counter has previously been input with "1" at S204 as mentioned before, the polarity reversal relay 188 is energized (S403) upon commencement of water feed. Then the electric power to be supplied to the electrolytic cell 36 for electrolysis is set, for example, to 30 W (S404) and the power supply is controlled such that the electrolytic power of the cell 36 becomes 30 W (S405). Thus, by way of the proportional-plus-integral-plus-derivative (PID) control method, a signal having a pulse width corresponding to a wattage of 30 W is delivered from the power control terminal of the microcomputer to the photocoupler 176 and the switching power circuit 174 is feed-back controlled in such a manner that the electric power actually supplied to the electrolytic cell is equal to 30 W. In this manner, power supply to the anode and cathode of the cell 36 is started to in turn commence the electrolysis of water.

Then, the electric conductivity calculation flag is checked to see if the calculation of the electric conductivity has been completed (S406). As this flag has been reset to zero by the initialization (S202) of the microcomputer as mentioned before, then task S407 is performed to calculate the electric conductivity of tap water. To this end, the electric potential at the junctions to the current detection resistor 190 and voltage detection resistors 192 is monitored so as to detect the current intensity I flowing across the cell electrodes as well as the voltage V applied between the electrodes and then, based on the current intensity I and the voltage V thus detected, calculation of the electric conductivity κ may be carried out in the following manner. First, the coefficient of conductivity χ is computed. The coefficient of conductivity X is expressed by the following equation.

$$\chi = S \cdot d/A \quad (1)$$

where S is the conductance of water, d is the electrode spacing, and A is the surface area of the electrodes.

As $S = I/(V - V_0)$ where $V_0$ represents the hydrogen overvoltage, by substituting it into equation (1) above, $$\chi = I \cdot d/\{(V - V_0) A\} \quad (2)$$

Equation (2) may be rewritten as follows.

$$\chi = K \cdot I/(V - V_0) \quad (3)$$

where K is a constant.

Since the coefficient of conductivity χ of water corresponds in substance to the electric conductivity of water κ(χ=κ), $$\kappa = K \cdot I/(V - V_0) \quad (4)$$

Figure 23:
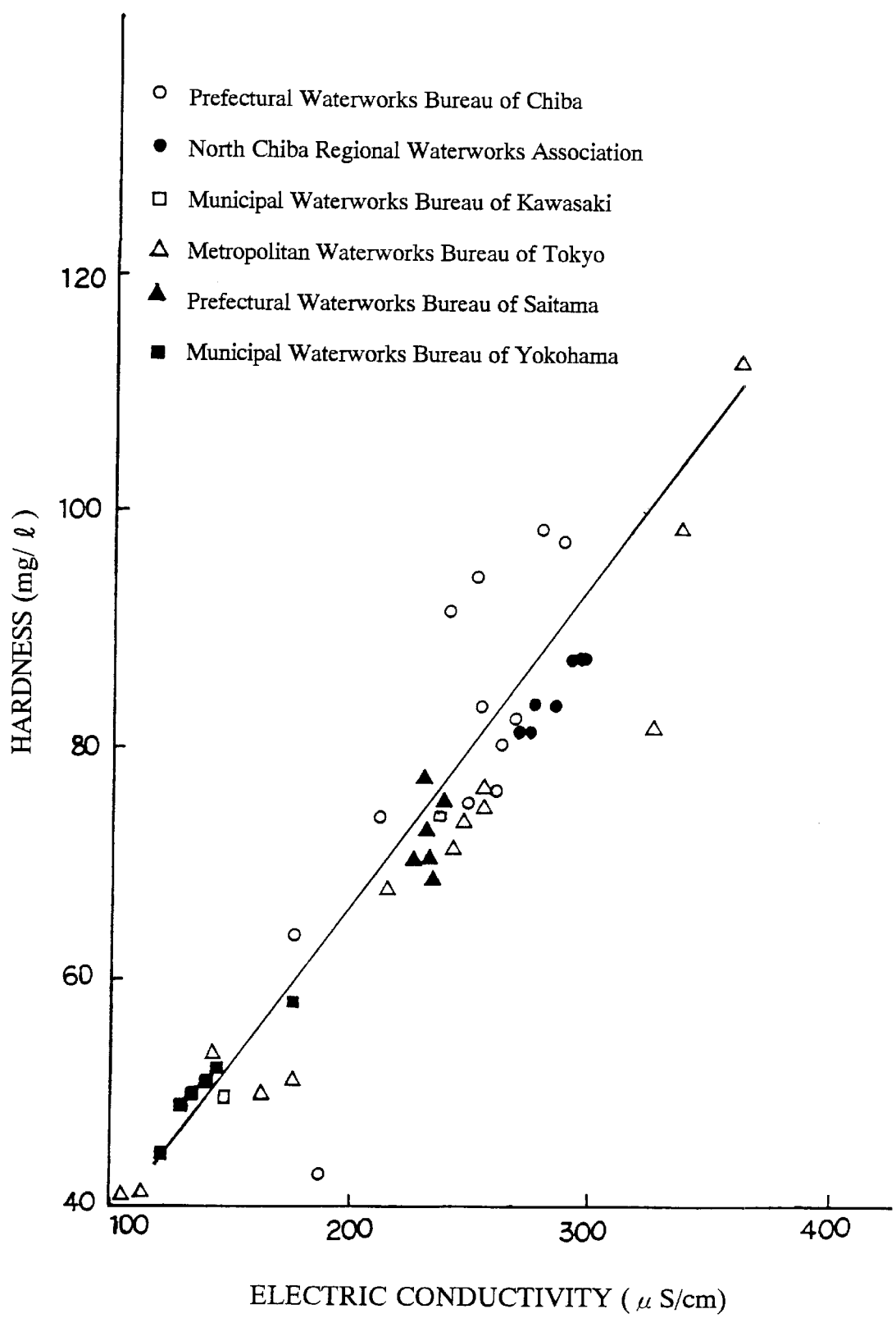
FIG. 23 is a graph showing the hardness of water versus the electric conductivity of water.

When the electric conductivity is calculated in the foregoing manner, an electric conductivity calculation flag is set to indicate completion of the calculation of the electric conductivity (S408) and the duration T of reverse potential descaling is calculated in accordance with the electric conductivity (S409). The duration T of reverse potential descaling may be determined to be T=Cκ, where C is a constant and may be ⅒, for example. As shown in the graph of FIG. 23 wherein statistical data of various public waterworks bureaus are given, the hardness of water is substantially proportional to the electric conductivity of water so that the electric conductivity is increased with increasing hardness. Accordingly, by determining the duration T of reverse potential descaling in accordance with the electric conductivity of water, the duration T would be fixed longer for water of such a quality that contains a large amount of calcium and magnesium ions and, therefore, precipitation of the scales is promoted. Conversely, for water of a quality having a small hardness, the duration of reverse potential descaling is shortened whereby the wait time of descaling can be curtailed.

Thereafter, the reverse potential descaling duration T calculated in this manner is set as the upper and lower limits of the cumulation counter (S410) and then the initial measurement demand flag is checked (S411). As this flag has previously been set to "1" (S205), then the reverse potential descaling duration is once set to zero (S412) and the initial measurement demand flag and the reverse potential descaling flag are cleared (S413 to S414) before returning to the main routine.

Figure 20B:
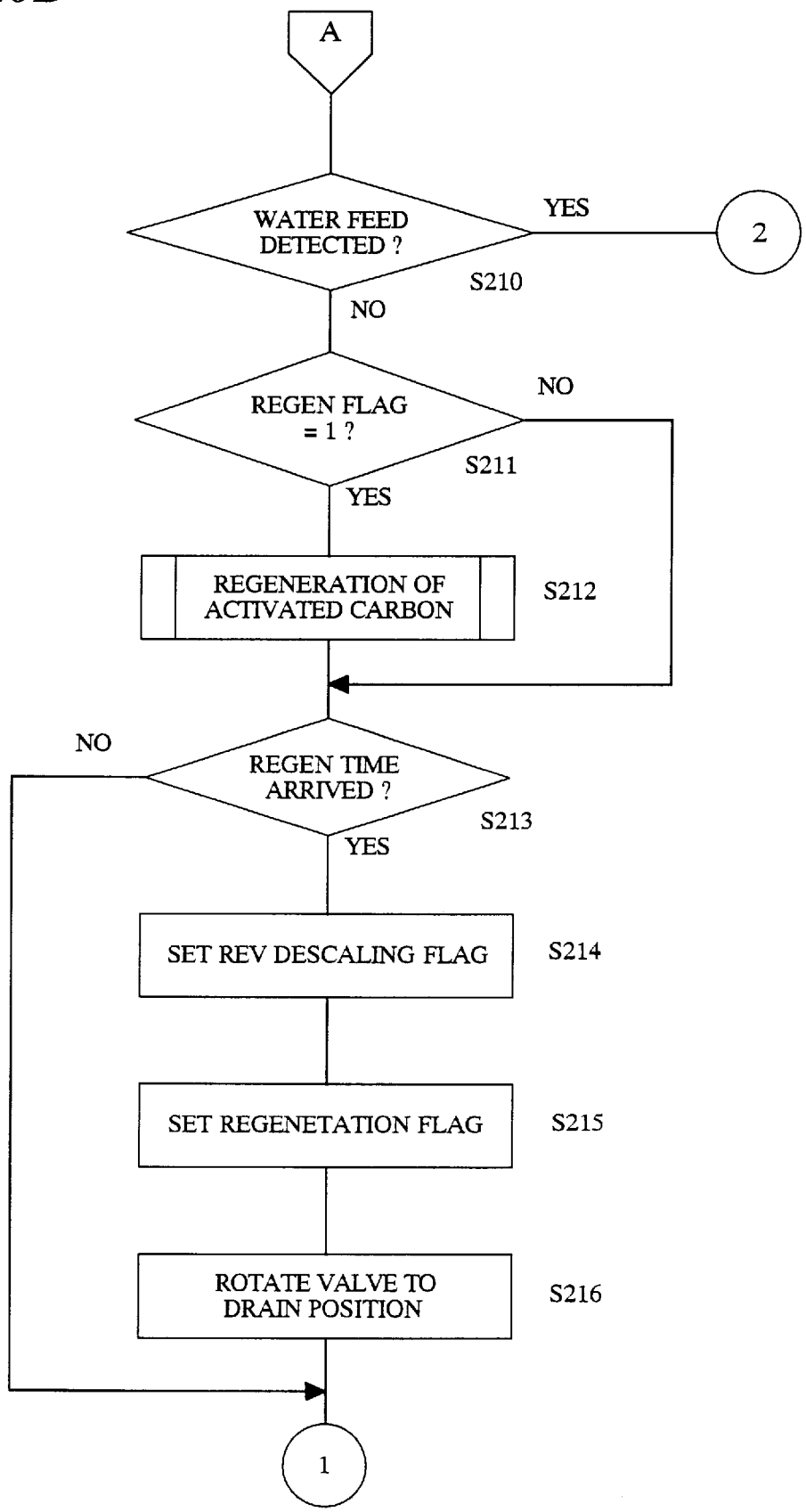
Figure 20C:
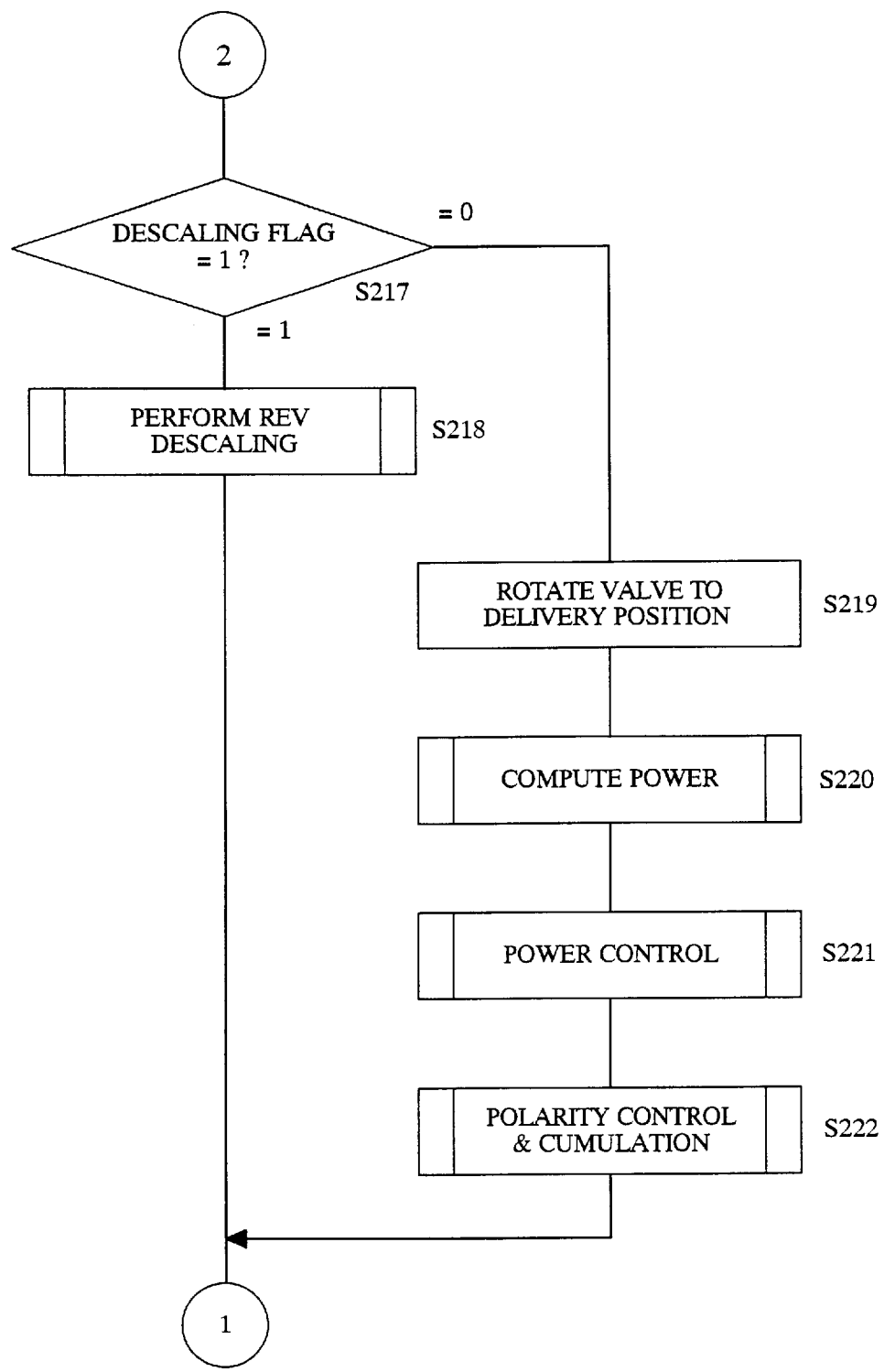

As the descaling flag is cleared (S414) in this manner after calculation of the electric conductivity as well as the reverse potential descaling time has been completed upon commencement of water feed, the next cycle of the main routine shown in FIGS. 20A–20C is so conducted that, after decision at S217, task S219 is performed wherein the control valve 130 is rotated to the water delivery position in which the first outlet 112 of the cell 36 is connected to the delivery hose 24. Then, a desired electrolysis power required to produce water having a pH appointed by the user through the switch 160 or 162 is computed (S220) and the electric power is controlled toward the desired electrolysis power (S221) to commence delivery of electrolyzed water.

Figure 24:
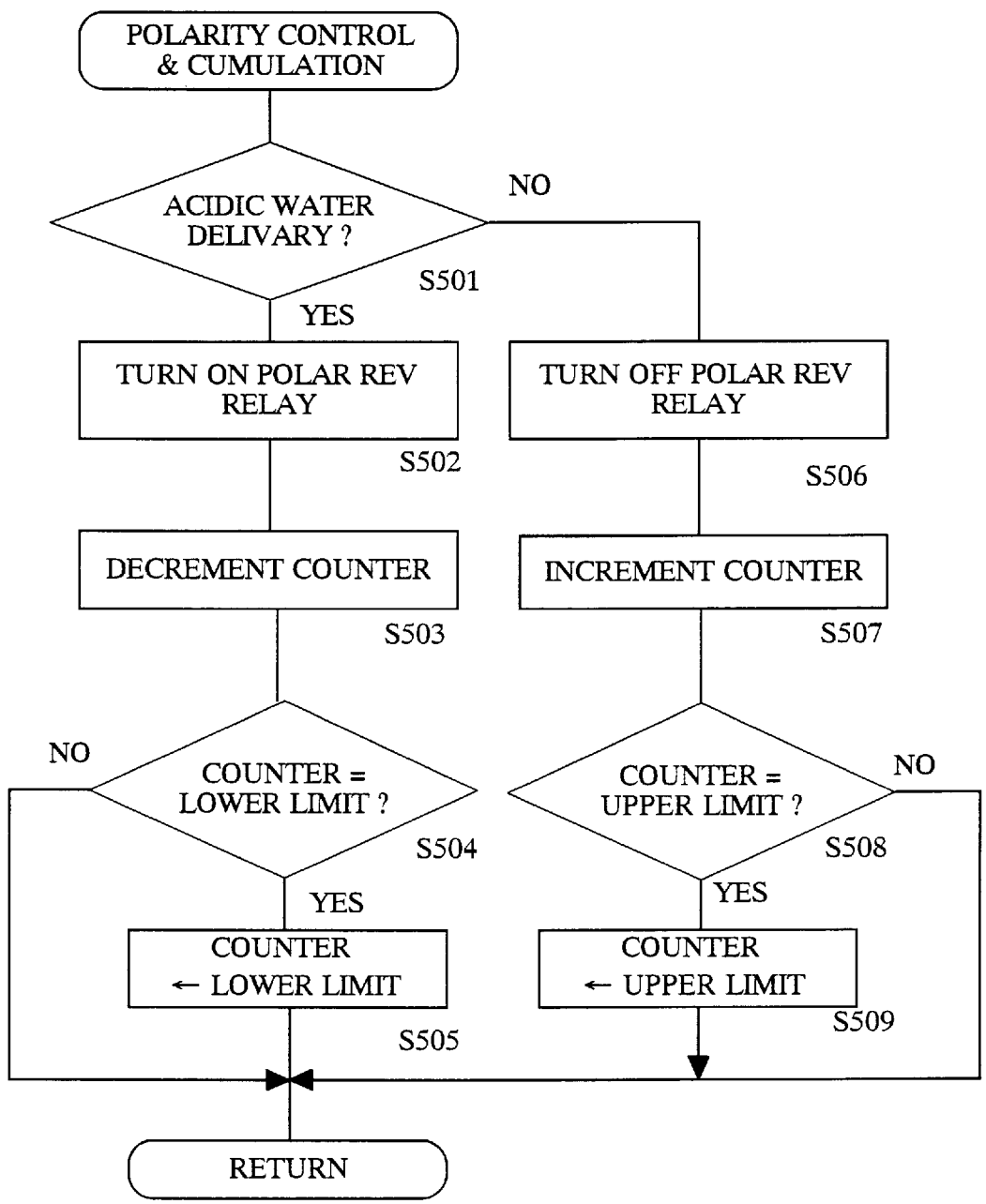
FIG. 24 is a flowchart showing a sub-routine for electrode polarity control and cumulation of the duration of electrolysis; and, FIG. 25 is a diagram showing the manner in which a cumulation counter is incremented or decremented as the electrolytic cell is operated in different modes.

During electrolysis, the electrode polarity is controlled and the duration of electrolysis in alkaline water supply mode and the duration of electrolysis in acidic water supply mode are cumulated while being countervailed with each other (S222). The detail of the polarity control and cumulation (S222) is shown in the flowchart of FIG. 24. First, based on the switch inputs, decision is made to see whether the user has selected acidic or alkaline water (S501).

When the user has selected "acidic water", the relay 188 is energized (S502) to switch over the reversal switch 186 so that an electric power is supplied to the cell 36 in such a polarity that the central electrode 100 acts as the anode and the lateral electrodes 98 and 102 serve as the cathode. Accordingly, acidic water is obtained at the first outlet 112 of the cell 36 and alkaline water is delivered from the second outlet 114. Acidic water is sent to the delivery hose 24 while alkaline water is forwarded to the drain hose 30. During operation in the acidic water delivery mode, the cumulation counter is decremented on the one second basis (S503).

When conversely the alkaline water supply mode is selected, the relay 188 is de-energized (S506) so that an electric power is supplied to the cell 36 in such a polarity that the central electrode 100 acts as the cathode and the lateral electrodes 98 and 102 serve as the anode. As a result, alkaline water is generated along the surfaces of the cathode and is forwarded to the first outlet 112 of the cell 36, with acidic water being produced along the surfaces of the anodes and forwarded to the second outlet 114. Alkaline water thus produced is sent via the delivery hose 24 to the faucet spout whereas acidic water is forwarded to the sink through the drain hose 30. It will be noted that, if strongly alkaline water is selected in the alkaline water delivery mode, correspondingly strongly acidic water will be obtained at the second outlet 114. Such strongly acidic water may be recovered from hose 30 and may be used for the purposes of sterilization and the like. During operation in the alkaline water delivery mode, the cumulation counter is incremented on the one second basis (S507).

An upper and lower limit are provided in cumulation of the duration of electrolysis (S504–S505; S508–S509) to ensure that the cumulated time does not surpass a limited range. This limit is a variable which varies in accordance with the water quality (i.e., the hardness of water) and may be identical in number to the duration of reverse potential descaling (S410) as described before.

Figure 25:
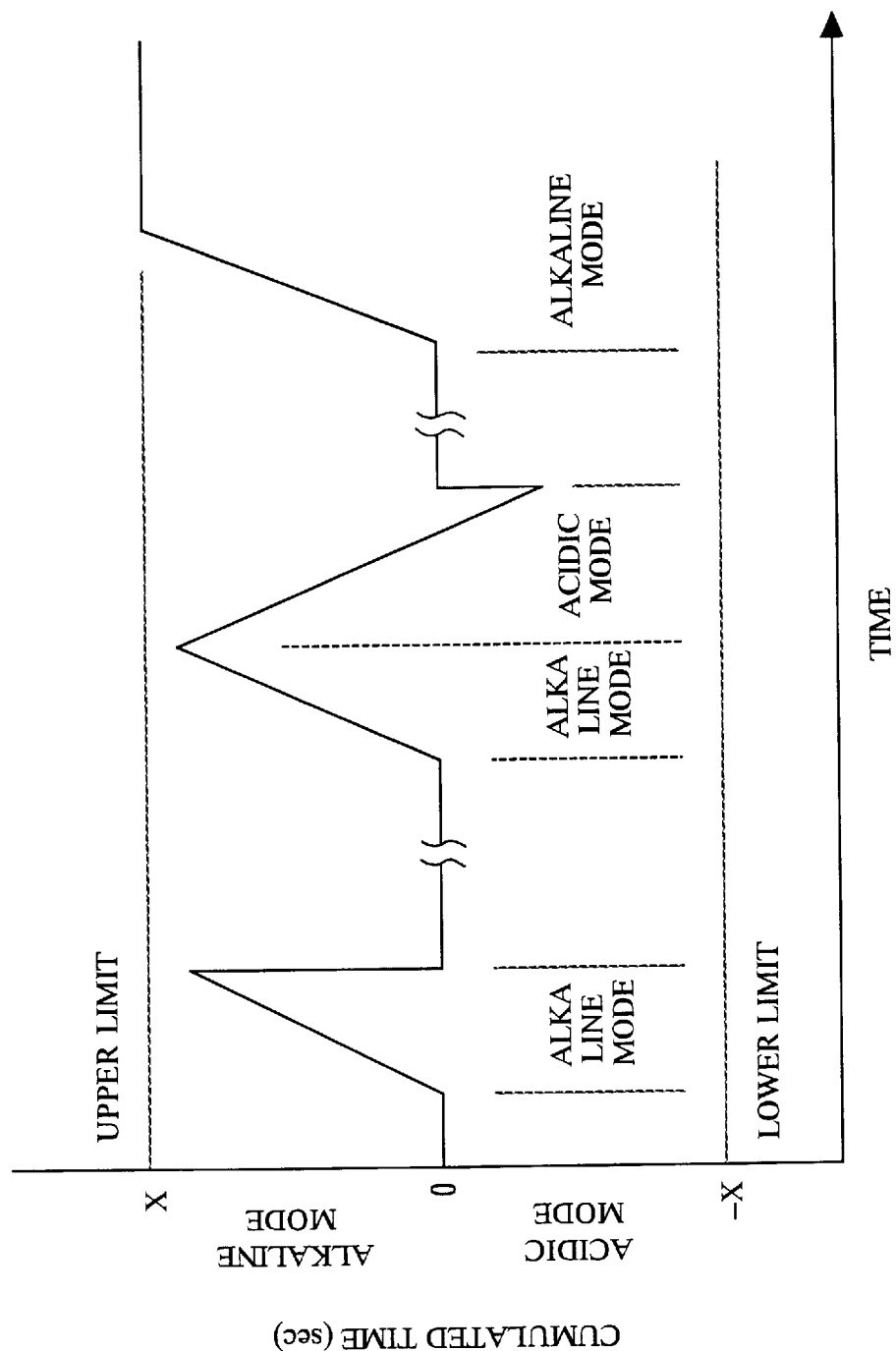

The manner of cumulation of the duration of electrolysis will be described with reference to the graph of FIG. 25 wherein three patterns of cumulation are illustrated. If the electrolytic cell is operated in the alkaline water supply mode, the duration of electrolysis will be incremented, for example, in the positive as shown in the left part of FIG. 25. If alkaline water delivery mode is followed by acidic water delivery mode as shown in the central part of the graph, the duration of electrolysis in the alkaline water supply mode and the duration of electrolysis in the acidic water supply mode will be countervailed with each other so that the cumulated time will be of the negative value if the duration of electrolysis in the acidic water delivery mode is longer. When the duration of operation in the alkaline water supply mode reaches the upper limit, for example, as shown in the right part of the graph of FIG. 25, the cumulated time will be limited to the upper limit X. The same applies to the lower limit –X. In this manner, when operated in both the alkaline water and acidic water delivery modes, the duration of electrolysis in respective modes will be cumulated within the limit of the maximum value X.

When the use of the water processing unit 10 is terminated and as long as water feed thereto is stopped (S210), the activated carbon regeneration flag is checked (S211). Since this flag has preliminarily been reset to zero in the microcomputer initializing sequence, the program skips to S213 to check whether the time for activated carbon regeneration has arrived. After the use of the processing unit 10 for a given day has ended and upon arrival of the activated carbon regeneration time (S213) which has been preset for midnight by the regeneration time set switches 155 and 157 of the control board 150, the reverse potential descaling flag is set (S214), the activated carbon regeneration flag is set to "1" (S215) and the control valve 130 is rotated to the drain position (S216) so as to connect the both outlets of the cell 36 to the drain hose 30. As the activated carbon regeneration flag is now set to "1" (see S215), the result of the decision at S211 in the next cycle of the program shown in FIGS. 20A–20C will be "YES" so that heating and regeneration of the activated carbon will be commenced (S212).

Figure 21:
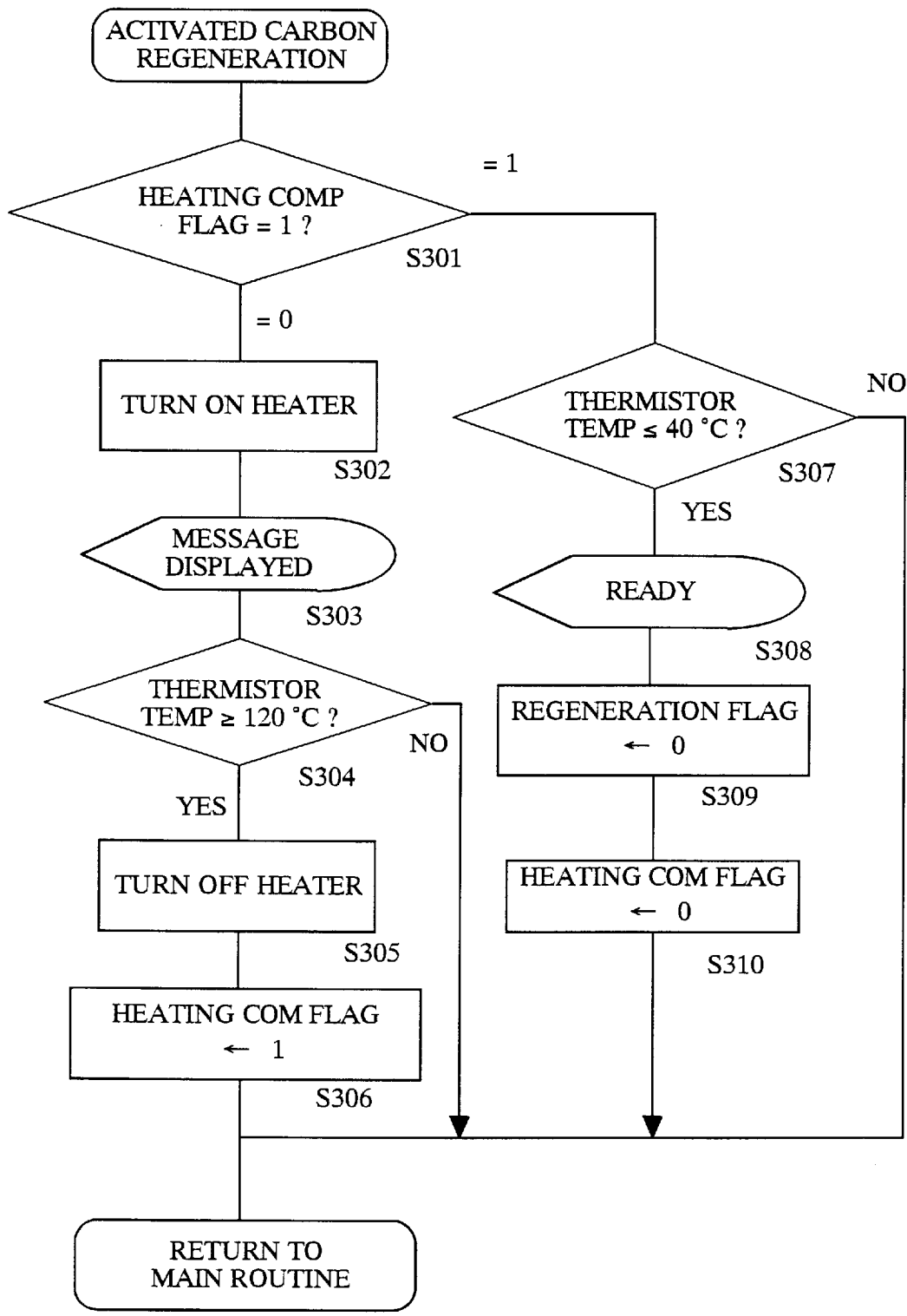
FIG. 21 is a flowchart showing a sub-routine for activated carbon regeneration.

Referring to FIG. 21 wherein the sub-routine for the activated carbon regeneration (S212) is shown, a heating completion flag is first checked (S301). In this regard, the heating completion flag is used to indicate whether or not heating of the activated carbon cartridge 34 has been completed and this flag is intended to distinguish a sequence (S304) in which the temperature rise of the cartridge 34 is monitored from a sequence (S307) in which the temperature drop is monitored as described later.

Since the heating completion flag has preliminarily been reset to zero during the course of the initialization of the microcomputer (S201), the SSR 194 is energized to commence power supply to the electric heater 60 (S302). Then, a warning message reading, for example, as "under regeneration" or "under preparation" is displayed on the display panel 158 (S303) to preclude the user from inadvertently using the water processing unit.

Upon operation of the heater, the activated carbon cartridge 34 is heated causing water in the cartridge 34 to boil. As the heater 60 is operated, the wax element of the temperature-sensitive direction control valve 78 expands to switch over the valve 78 whereby hot water and steam generated in the cartridge 34 are discharged through the drain hose 30 into the sink 12. Under the action of hot water and steam, the activated carbon in the cartridge is sterilized by boiling and chlorine ions and volatile substances such as trihalomethanes which have been adsorbed by the activated carbon are desorbed from the activated carbon whereby the activated carbon is regenerated.

Regeneration of the activated carbon will be completed when water contained in the cartridge 34 and water impregnated in the activated carbon are depleted by evaporation, whereupon the temperature of the cartridge 34 will begin to rise. When the temperature as detected by the output signal of the thermistor 70 has exceeded, say, 120° C. (S304), power supply to the heater 60 is terminated (S305).

Then, the heating completion flag is set to "1" (S306) to ensure that cooling of the cartridge 34 is monitored (S301→S307). As the cartridge 34 is cooled by heat radiation and the ambient temperature of the temperature responsive valve 78 becomes lower than 60° C., the valve 78 responds automatically to connect the outlet 58 of the cartridge 34 to the water delivery hose 24 so as to bring the processing unit in a condition ready for use. As the temperature of the cartridge 34 is further lowered to become lower than 40° C. (S307), a "ready" message is displayed (S308) and the heating completion flag and the regeneration flag are reset to "0" (S309–S310).

After regeneration of the activated carbon is automatically commenced upon arrival of the preset time, preferably at night, and is then completed in the foregoing manner, tasks S206–S211 will be repeated until water is fed for the first time in the next morning. Since the descaling flag has already been set (S214) upon arrival of the activated carbon regeneration time, the program proceeds from S217 to S218 at the time of the first water feed in the next morning (S210) whereby the reverse potential descaling of the electrodes is carried out.

Referring to the flowchart of FIGS. 22A and 22B, in the subroutine for the reverse potential descaling, the cumulation counter is checked (S401) and the relay 188 is controlled in such a manner that an electric potential of a polarity opposite to the polarity of the mode which has been used for a longer period in the preceding day is applied between the electrodes (S402 or S403), followed by setting of the electric power (S404) and control of the power supply (s405) as described before. In this regard, in the case where the sum of the cumulation counter is zero, the program skips to S416 to thereby omit the reverse potential descaling, in consideration of the fact that, because the alkaline water delivery mode and the acidic water delivery mode have been alternately performed for an equal period of time, the scales such as calcium carbonate which might have precipitated on the electrodes have already been removed so that the electrodes have been self-cleaned.

It will be noted that, at the time of the first descaling after the water processing unit 10 has been connected to the power source, the initial measurement of the electric conductivity has been completed as described before so that the electric conductivity calculation flag has already been set (S408). Accordingly, task S406 is followed by task S415 whereby the reverse potential descaling will be carried out until the descaling time determined in accordance with the electric conductivity elapses.

At the time of the reverse potential descaling carried out more than one day after connection to the power source, task S406 is followed by task S407 whereby the electric conductivity is measured and renewed everyday. Upon completion of the reverse potential descaling in the foregoing manner, the cumulation counter, the reverse potential descaling flag and the electric conductivity calculation flag are cleared, respectively (S416–S418). As a result, as long as electrolysis of water is continued, the computation of the desired electrolysis power (S220) and the power control (S221) are performed and the duration of electrolysis is cumulated (S222). It will be noted that, because the initial measurement demand flag (S411) has been cleared (S413) at the time of the first descaling after power source connection, the second and subsequent descaling after power source connection will be carried out only for the time period calculated at S409.

While the present invention has been described herein with reference to the specific embodiments thereof, it is contemplated that the invention is not limited thereby. For example, although the reverse potential descaling of the electrodes for the removal of the scales has been described as being carried out once everyday, the cycle thereof may be altered as required. Similarly, while the water electrolyzer according to the invention has been described as being incorporated in a water purifier, the electrolyzer may be used solely. Furthermore, an electrolytic cell of the membrane type may be used in lieu of the non-membrane type cell.

We claim:

1. In a water electrolyzer having an electrolytic cell provided with a pair of electrodes forming an electrolytic flowpath therebetween, means for applying between said electrodes a DC potential of a first polarity to electrolyze water flowing through said flowpath and thereby produce alkaline and acidic water, switching means for reversing the polarity of the DC potential applied between said electrodes, and control means for controlling said switching means in such a manner that a DC potential of a polarity opposite to said first polarity is applied between the electrodes to remove scale precipitated on the electrodes during electrolysis of water;

wherein the improvement to said control means comprises means for detecting the hardness of water to be electrolyzed and wherein said control means is adapted to control the duration of application of DC potential of said opposite polarity in accordance with the detected hardness of water.

2. A water electrolyzer according to claim 1, wherein said means for detecting the hardness of water comprises means for detecting the electric conductivity of water and wherein said control means is operable to detect the hardness of water in accordance with the detected electric conductivity of water.

3. A water electrolyzer according to claim 2, wherein said means for detecting the electric conductivity of water is operable to detect the voltage of the potential applied between said electrodes and the current flowing across said electrodes and wherein said control means is operable to detect the electric conductivity of water in accordance with the detected voltage and current.

4. A water electrolyzer according to claim 3, wherein said control means derives a variable which varies in accordance with the hardness of water, said control means being operable to cumulate the duration of electrolysis in alkaline water supply mode and the duration of electrolysis in acidic water supply mode by countervailing them with each other within a limit of said variable, and wherein said control means is operable to apply between the electrodes a DC potential of a polarity opposite to the polarity that corresponds to the cumulated duration.

5. A water electrolyzer according to claim 2, wherein said control means derives a variable which varies in accordance with the hardness of water, said control means being operable to cumulate the duration of electrolysis in alkaline water supply mode and the duration of electrolysis in acidic water supply mode by countervailing them with each other within a limit of said variable, and wherein said control means is operable to apply between the electrodes a DC potential of a polarity opposite to the polarity that corresponds to the cumulated duration.

6. A water electrolyzer according to claim 1, wherein said electrolytic cell is of the non-membrane type.

7. A water electrolyzer according to claim 6, wherein said control means derives a variable which varies in accordance with the hardness of water, said control means being operable to cumulate the duration of electrolysis in alkaline water supply mode and the duration of electrolysis in acidic water supply mode by countervailing them with each other within a limit of said variable, and wherein said control means is operable to apply between the electrodes a DC potential of a polarity opposite to the polarity that corresponds to the cumulated duration.

8. A water electrolyzer according to claim 1, wherein said control means derives a variable which varies in accordance with the hardness of water, said control means being operable to cumulate the duration of electrolysis in alkaline water supply mode and the duration of electrolysis in acidic water supply mode by countervailing them with each other within a limit of said variable, and wherein said control means is operable to apply between the electrodes a DC potential of a polarity opposite to the polarity that corresponds to the cumulated duration.

* * * * *